US012669439B2

(12) United States Patent
Kang et al.

(10) Patent No.: US 12,669,439 B2
(45) Date of Patent: Jun. 30, 2026

(54) SURFACE-ENHANCED RAMAN SCATTERING (SERS) INDUCED STRUCTURE TRANSFER METHOD FOR RUBBING TECHNIQUES

(71) Applicant: Research & Business Foundation SUNGKYUNKWAN UNIVERSITY, Suwon-si (KR)

(72) Inventors: Dae Joon Kang, Suwon-si (KR); Hyun Je Park, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 121 days.

(21) Appl. No.: 18/738,761

(22) Filed: Jun. 10, 2024

(65) Prior Publication Data

US 2024/0410832 A1     Dec. 12, 2024

(30) Foreign Application Priority Data

Jun. 12, 2023     (KR) ........................ 10-2023-0075163

(51) Int. Cl.
G01N 21/65          (2006.01)
(52) U.S. Cl.
CPC .................................. G01N 21/658 (2013.01)
(58) Field of Classification Search
CPC ...... G01N 21/65; G01N 21/658; G01N 21/01; C09D 101/02; C09D 7/63; C09D 7/61
See application file for complete search history.

(56) References Cited

U.S. PATENT DOCUMENTS

| | | | | |
|---|---|---|---|---|
| 2009/0225310 A1* | 9/2009 | Yang | .................... | H10D 64/693 |
| | | | | 977/700 |
| 2011/0244197 A1* | 10/2011 | Takemura | ............. | G03F 7/0392 |
| | | | | 430/326 |
| 2013/0172207 A1* | 7/2013 | Dai | ....................... | G01N 21/648 |
| | | | | 506/30 |
| 2013/0182249 A1* | 7/2013 | Weiss | .................... | B21D 22/00 |
| | | | | 117/88 |
| 2014/0335678 A1* | 11/2014 | Lee | ......................... | H01L 24/03 |
| | | | | 438/464 |
| 2015/0308960 A1* | 10/2015 | Shih | ..................... | G01N 21/658 |
| | | | | 356/301 |
| 2015/0316465 A1* | 11/2015 | Mourey | ............... | G01N 21/658 |
| | | | | 356/244 |

(Continued)

FOREIGN PATENT DOCUMENTS

| | | |
|---|---|---|
| KR | 10-2020-0129667 | 11/2020 |
| KR | 10-2023-0056122 A | 4/2023 |
| KR | 10-2023-0068510 | 5/2023 |

*Primary Examiner* — Sang H Nguyen
(74) *Attorney, Agent, or Firm* — LEX IP MEISTER, PLLC

(57) ABSTRACT

Since the transfer of an SERS induced structure according to an embodiment of the disclosure uses the interfacial energy between a water surface and a thin film substructure, it is possible to perform the transfer intact without any damage to the structure. At this time, the SERS induced structure is transferred onto a non-uniform and rough surface, wherein since the transfer structure covers the surface, various types of flexible materials may be used. As a result, Raman signals and laser scattering are minimized, thereby increasing signal reproducibility, and various physical properties of a transfer target may be applied to rubbing techniques.

12 Claims, 26 Drawing Sheets

SERS substrate

Dipping SERS substrate into water

SERS-active structure

Releasing SERS-active structure

Making the structure free-standing

Flexible support

Transferring the structure on flexible support

(56)             References Cited

U.S. PATENT DOCUMENTS

| | | | | |
|---|---|---|---|---|
| 2016/0202123 | A1* | 7/2016 | Jung | B29C 33/3857 |
| | | | | 156/232 |
| 2018/0297321 | A1* | 10/2018 | Jin | C23C 22/66 |
| 2019/0112494 | A1* | 4/2019 | Thalappil | C09D 5/1681 |
| 2020/0020461 | A1* | 1/2020 | Watkins | H01B 1/08 |
| 2020/0333217 | A1* | 10/2020 | Kang | G01N 1/14 |
| 2022/0178050 | A1* | 6/2022 | Okutsu | C07K 1/306 |
| 2022/0228993 | A1 | 7/2022 | Eiamchai et al. | |
| 2022/0299444 | A1* | 9/2022 | Garg | G01N 21/658 |

* cited by examiner (1) Conventional route 5 mm (2) Structure transfer route 5 mm

FIG. 2B (1) Conventional route (2) Structure transfer route

Dipping SERS substrate
into water

Releasing SERS-active structure

Making the structure
free-standing

Transferring the structure
on flexible support

SURFACE-ENHANCED RAMAN SCATTERING (SERS) INDUCED STRUCTURE TRANSFER METHOD FOR RUBBING TECHNIQUES

CROSS-REFERENCE TO RELATED APPLICATION(S)

This application claims priority to Korean Patent Application No. 10-2023-0075163, filed on Jun. 12, 2023, the entire disclosure of which is incorporated herein for all aspects.

BACKGROUND

The disclosure relates to a method for transferring an induced structure, and more specifically, to a transfer of a surface-enhanced Raman scattering (SERS) induced structure and a flexible SERS substrate for rubbing techniques using the same.

The surface enhanced Raman scattering (SERS) effect accurately detects clinical samples down to the single-atomic level. However, research on existing SERS induced structures was conducted mainly on flat rigid substrates, and the use of such a flat rigid substrate has the problem of making it difficult to use the sensing in a general and easy manner and making the sampling step for detection complicated.

The conventional SERS sensing procedure, including the sampling steps, is as follows: (1) a collected sample is put into a solution state, (2) the liquid sample is dropped on the surface of an SERS substrate, and (3) after drying, detection is performed through Raman signal measurement.

In this case (1) the sampling and formation steps are complex, and (2) adsorption of clinical samples is uneven due to the "coffee ring effect" caused by evaporation of liquid samples, making it difficult to detect Raman signals with precision and reproducibility.

Accordingly, in order to overcome these problems and expand application possibilities, a technological trend has emerged to use the SERS sensing platform from the existing rigid body to the flexible material.

If a flexible material is used as a substrate when manufacturing an SERS induced structure, the detection process becomes easier because sampling is possible through simple attachment or physical contact. In particular, since this detection procedure is acceptable even for everyday item surfaces exhibiting certain roughness and curvature, there is also an advantage of presenting potential as an on-site diagnostic sensor.

However, the general limitations of these flexible SERS substrates are as follows: for signal amplification, nanostructures with high sensitivity and high resolution must be used, but manufacturing such structures is not easy on flexible materials.

In particular, since simple contact with the detection surface is not effective in collecting clinical samples, higher quality nanostructures are required, which results in increasing the overall process cost. Moreover, non-planar surfaces detectable through physical contact are extremely limited in terms of surface roughness and curvature, which greatly limits their practical application.

Accordingly, a rubbing (swabbing) technique, which simultaneously captures tiny clinical samples and amplifies Raman signals by implanting an SERS induced structure on a non-planar flexible material, has recently been receiving a lot of attention in SERS research. The core of the rubbing technique is the process of implanting an SERS induced structure on flexible materials such as non-woven fabric, paper, cotton, and cotton swabs, and then extracting samples through a "process of repeatedly rubbing" the surface to be detected.

In this case, there is no need for a separate sampling process like a general flexible SERS substrate, and the repeated rubbing has an advantage of effectively amplifying the Raman signal by condensing minute clinical samples in one place.

However, there is a long-standing problem that it is difficult to fabricate SERS induced structures on non-planar flexible materials using existing microstructure fabrication technologies. The vast majority of studies fabricate flexible SERS substrates for rubbing techniques based on chemical synthesis methods.

However, in this case, because a significant level of surface roughness is reflected as is, there is a problem in that the laser used or the Raman signal generated is seriously scattered.

In addition, due to low signal reproducibility, it acts as a factor that makes it difficult to study various SERS performance evaluation indicators (degree of signal amplification, reusability, signal uniformity, etc.) required for verification of sensing ability.

In particular, because the types of SERS induced structures and the flexible materials (substrates) on which they are implanted are limited, the detection surface is also extremely limited.

Therefore, there is a need for a method for separating the SERS induced structure from an original substrate and then transplanting the same onto various non-planar surfaces through a "structure transfer strategy".

SUMMARY

According to an aspect of the disclosure, provided is a transfer method for an SERS induced structure so that various physical properties of a transfer target are applied to a rubbing technique regardless of the type or surface roughness of a structure transfer target.

In addition, a flexible SERS substrate manufactured in this way makes it possible to collect and detect clinical samples by rubbing the same on various non-flat surfaces, and provided is an opportunity to systematically study various SERS performance by dramatically improving signal reproducibility.

The aspect of the disclosure is not limited to that mentioned above, and other aspects not mentioned will be clearly understood by those skilled in the art from the description below.

According to an embodiment of the disclosure, provided is a method for transferring an SERS induced structure, the method including: forming a water-soluble thin film on a substrate; manufacturing a surface-enhanced Raman scattering (SERS) induced structure on the water-soluble thin film; separating the SERS induced structure from the substrate through capillary separation; and transferring the separated SERS induced structure onto a flexible material.

A water-soluble material forming the water-soluble thin film may be selected from the group consisting of polyvinyl alcohol, polyethylene glycol, dextran, polyvinylpyrrolidone, carboxymethylcellulose, salmon DNA, sodium chloride, ammonium sulfate, or ammonium persulfate.

The thickness of the water-soluble thin film may be 10 nm to 100 nm.

The manufacturing of the SERS induced structure may include manufacturing a metal nanostructure or manufacturing a polymer thin film-based structure.

In the separating of the SERS induced structure, the SERS induced structure, water-soluble thin film, and substrate may be simultaneously immersed in water and the substrate may be placed into the water at a slower rate than the separation rate of the water-soluble thin film.

In the separating of the SERS induced structure, a capillary peeling effect may be used, wherein the moment the SERS induced structure, water-soluble thin film, and substrate touch water, the water-soluble thin film is dissolved rapidly and the SERS induced structure is separated from the substrate.

The separated SERS induced structure may be a self-supporting structure that floats on a water surface based on the surface energy of water.

The transferring of the separated SERS induced structure may be a transfer by the capillary force of water.

The transferring of the separated SERS induced structure may further include post-transfer heating.

The heating may be performed at 50 to 90° C.

According to another embodiment of the disclosure, provided is a flexible SERS substrate manufactured by transferring and drying an SERS induced structure on a flexible material according to the method described above.

The SERS substrate may be available using a rubbing technique.

The transferred SERS induced structure may cover the surface of the flexible material.

Since the transfer of an SERS induced structure according to an embodiment of the disclosure uses the interfacial energy between a water surface and a thin film substructure, it is possible to perform the transfer intact without any damage to the structure.

The SERS induced structure is transferred onto a non-uniform and rough surface, wherein since the transfer structure covers the surface, various types of flexible materials may be used.

As a result, Raman signals and laser scattering are minimized, thereby increasing signal reproducibility, and various physical properties of a transfer target may be applied to rubbing techniques.

The effects of the disclosure are not limited to the effects described above, and should be understood to include all effects that are inferable from the configuration of the disclosure described in the detailed description or claims of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1A shows a process in which an SERS induced structure is separated from an existing substrate due to water penetration and transferred onto a flexible transfer target; FIG. 1B shows a process in which an actually manufactured SERS induced structure is separated upon contact with water and changes into a self-supporting form; FIG. 1C shows a process in which the self-supporting SERS induced structure is transferred onto a cotton swab through a slow rolling process after contacting the surface of the cotton swab; FIG.

Figure 2A:
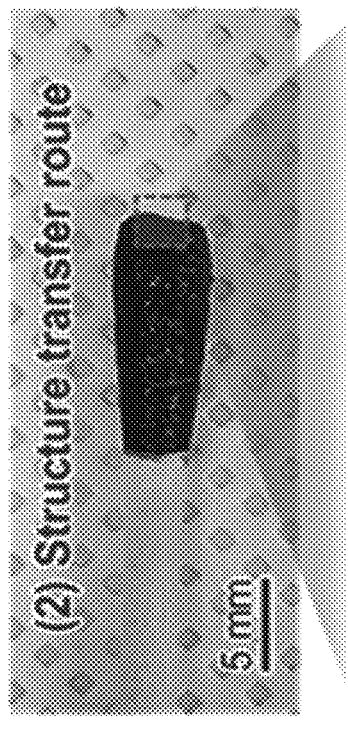
Figure 2A:
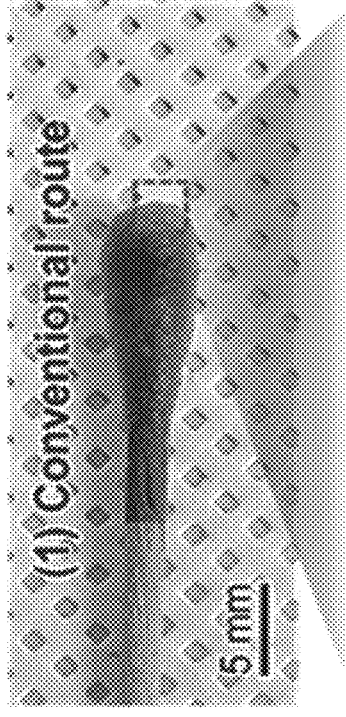
Figure 2C:
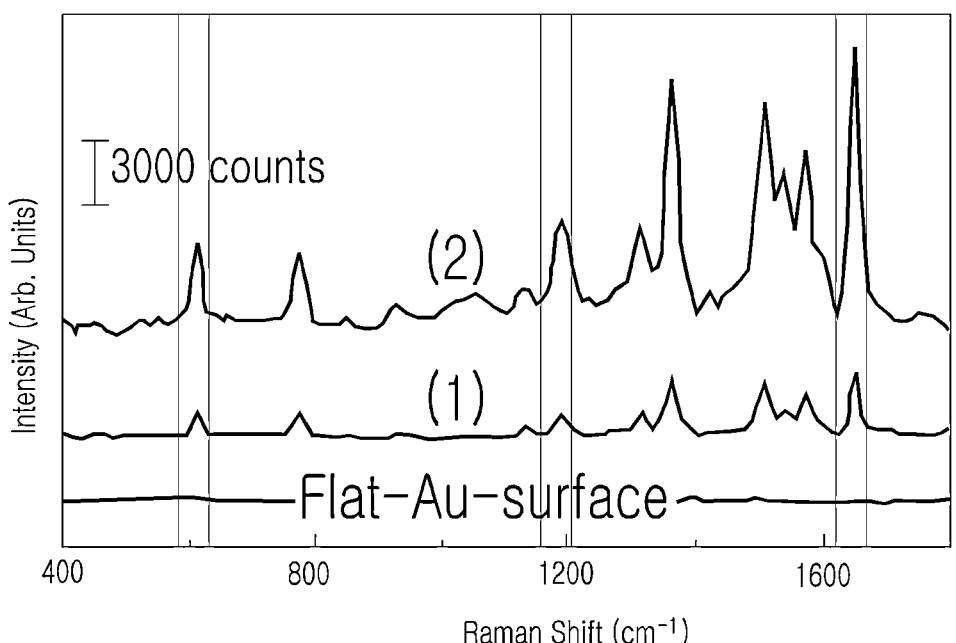
Figure 2D:
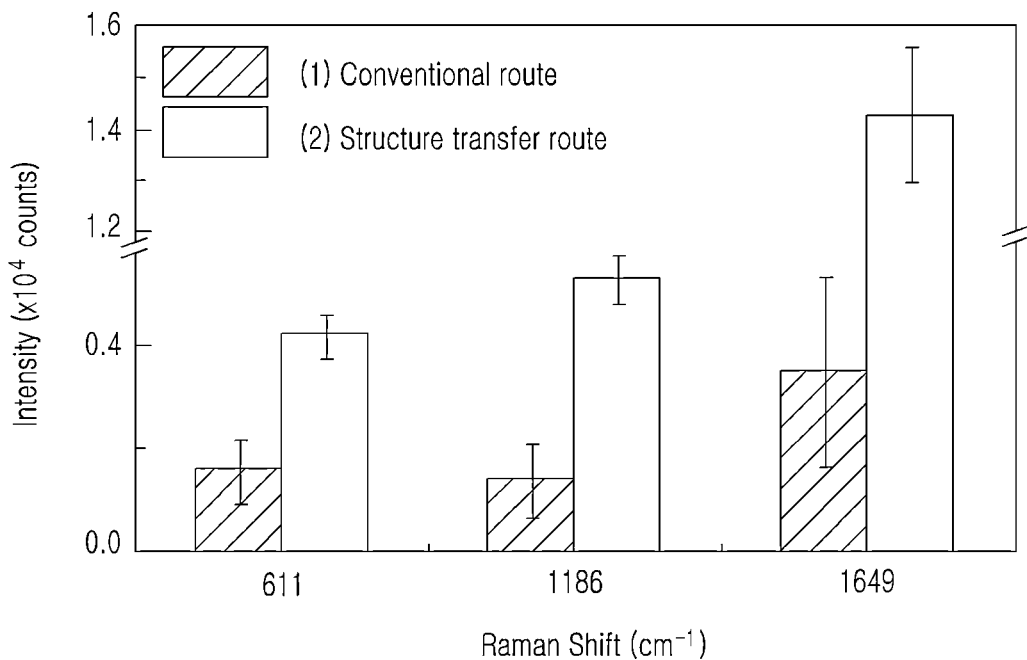
Figure 2E:
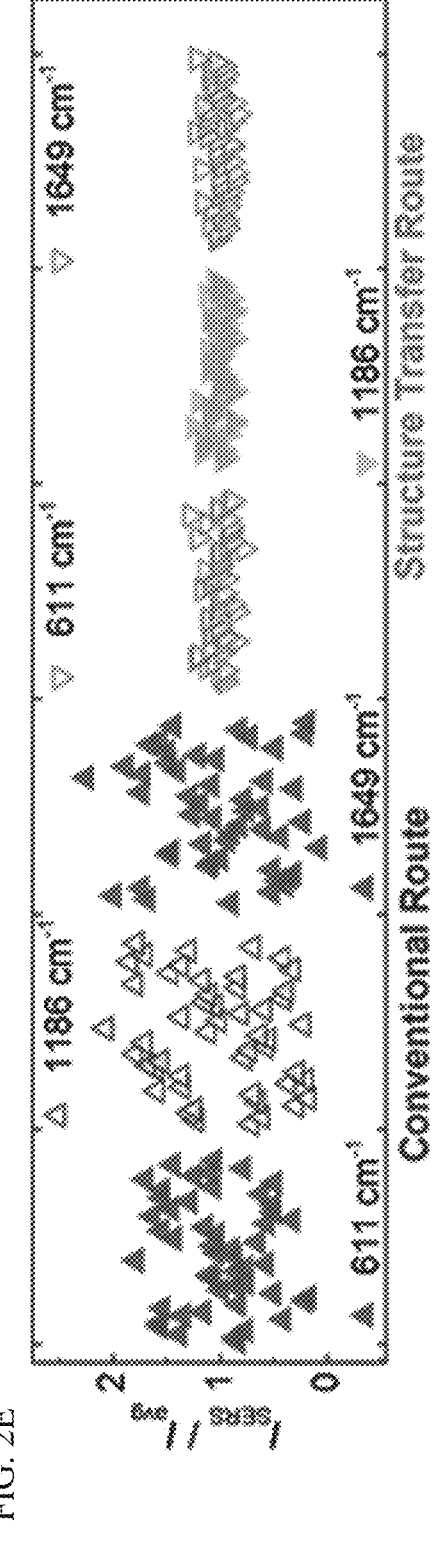
Figure 3A:
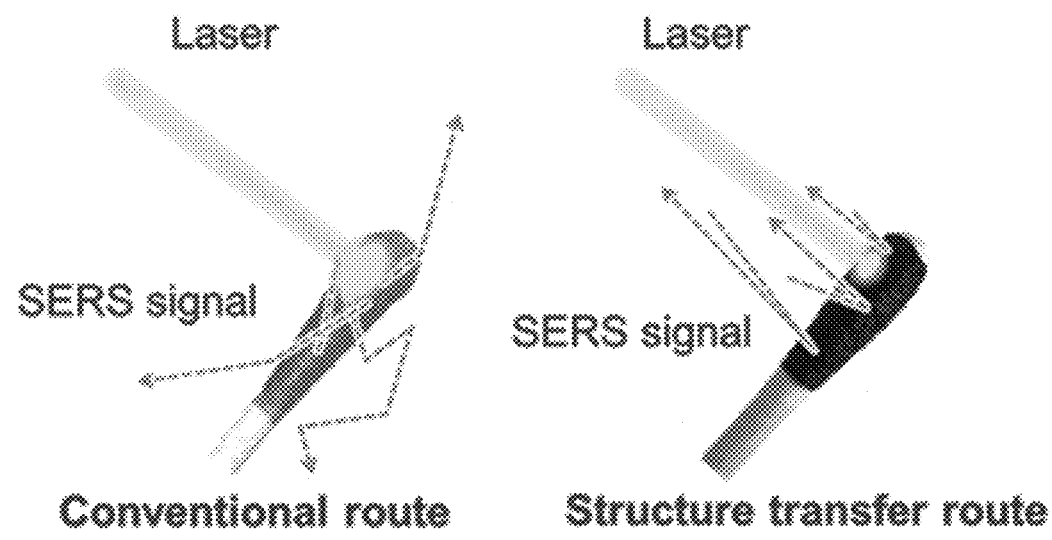
Figure 3B:
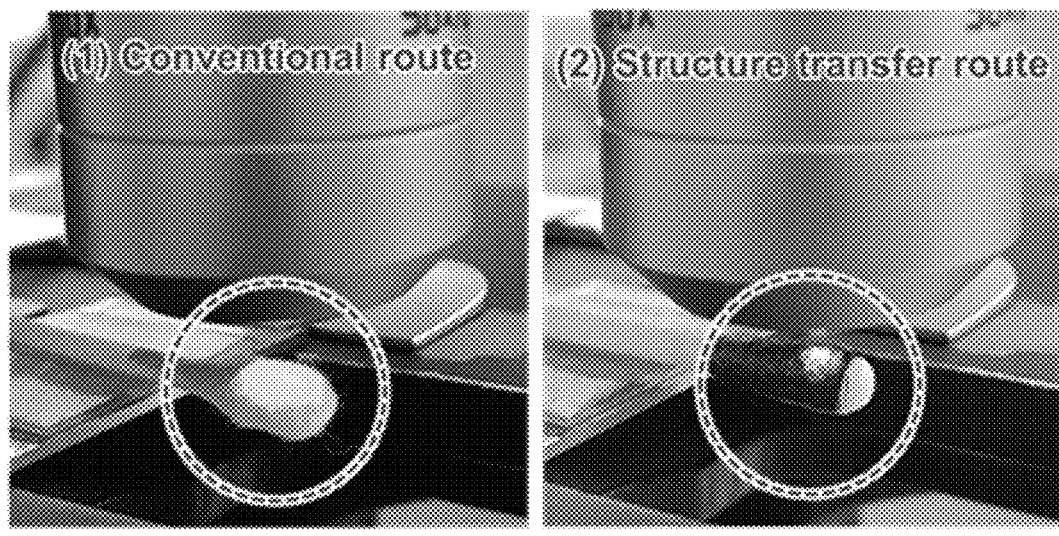
Figure 3C:
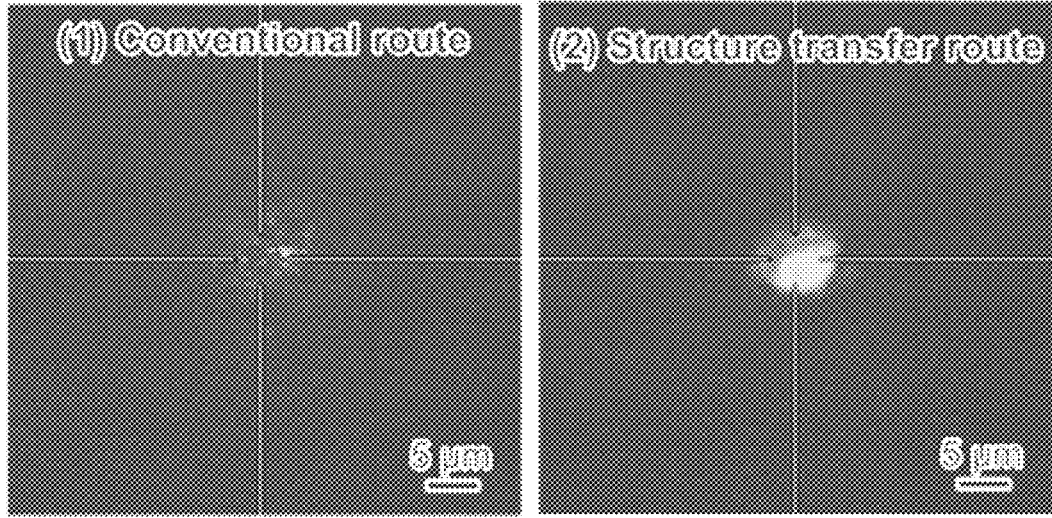
Figure 4A:
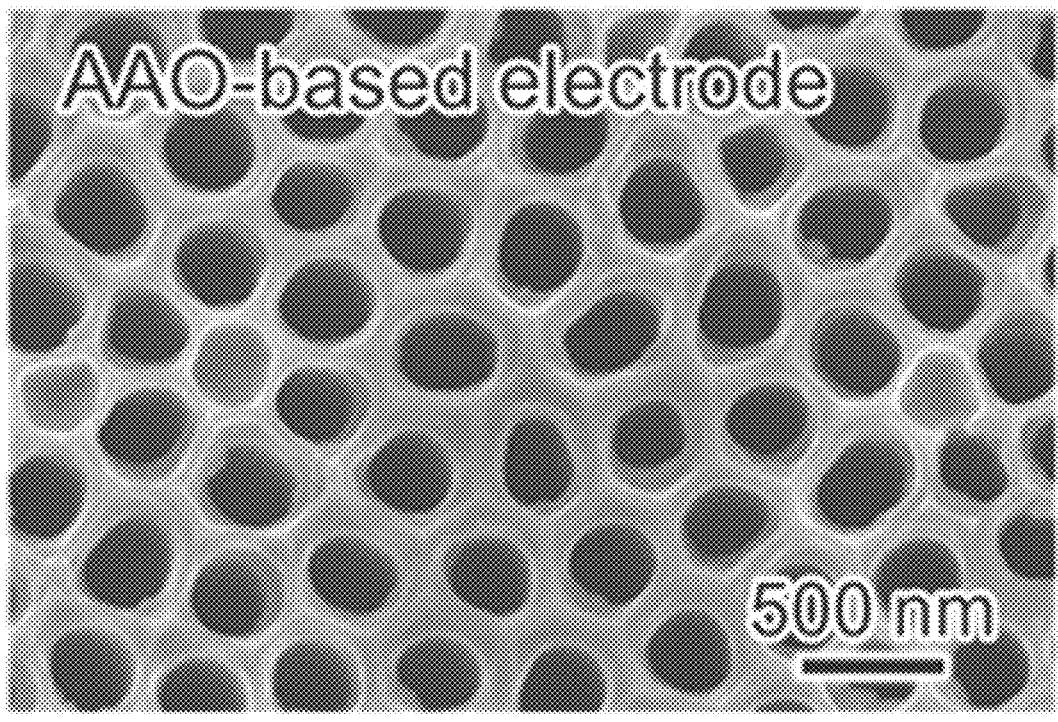
Figure 4B:
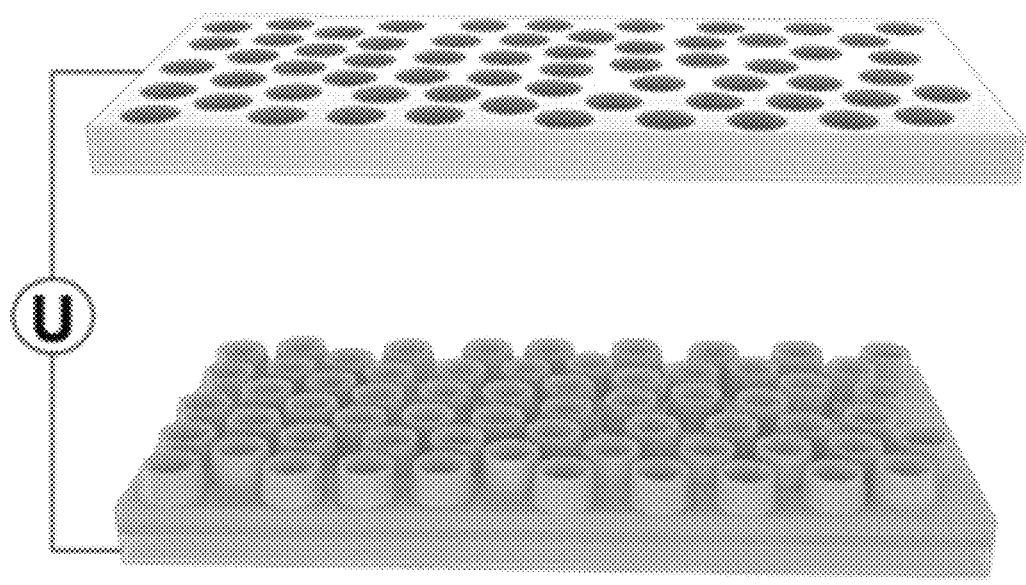
Figure 4C:
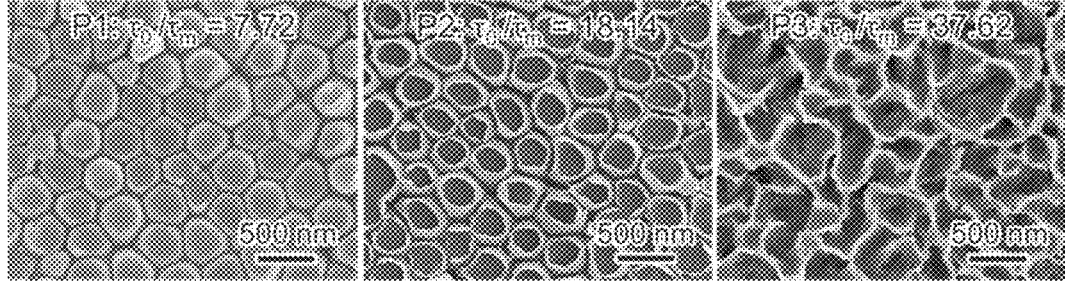
Figure 5A:
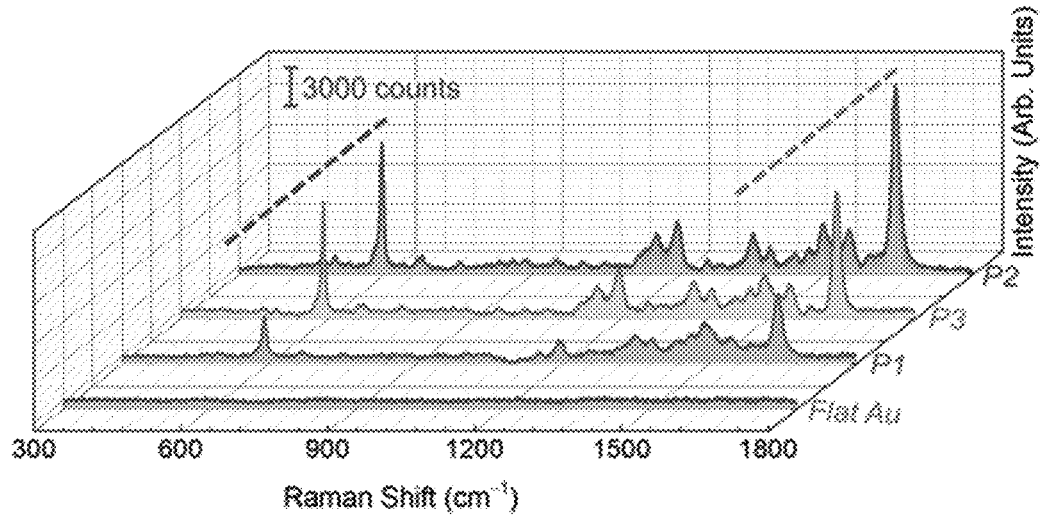
Figure 5B:
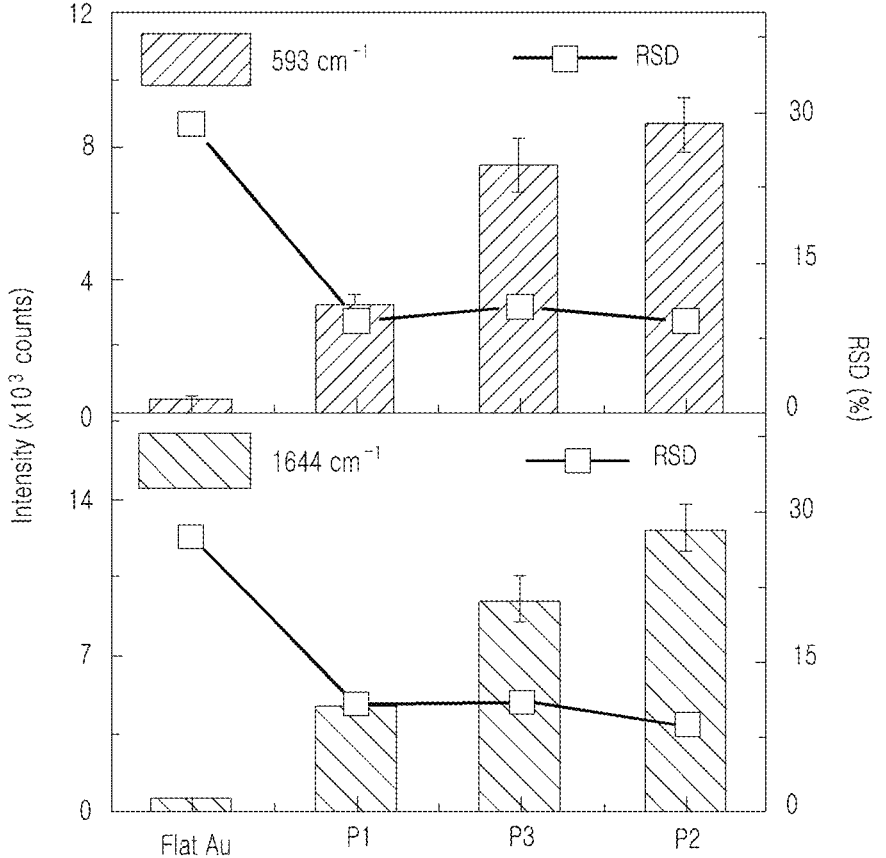
Figure 5C:
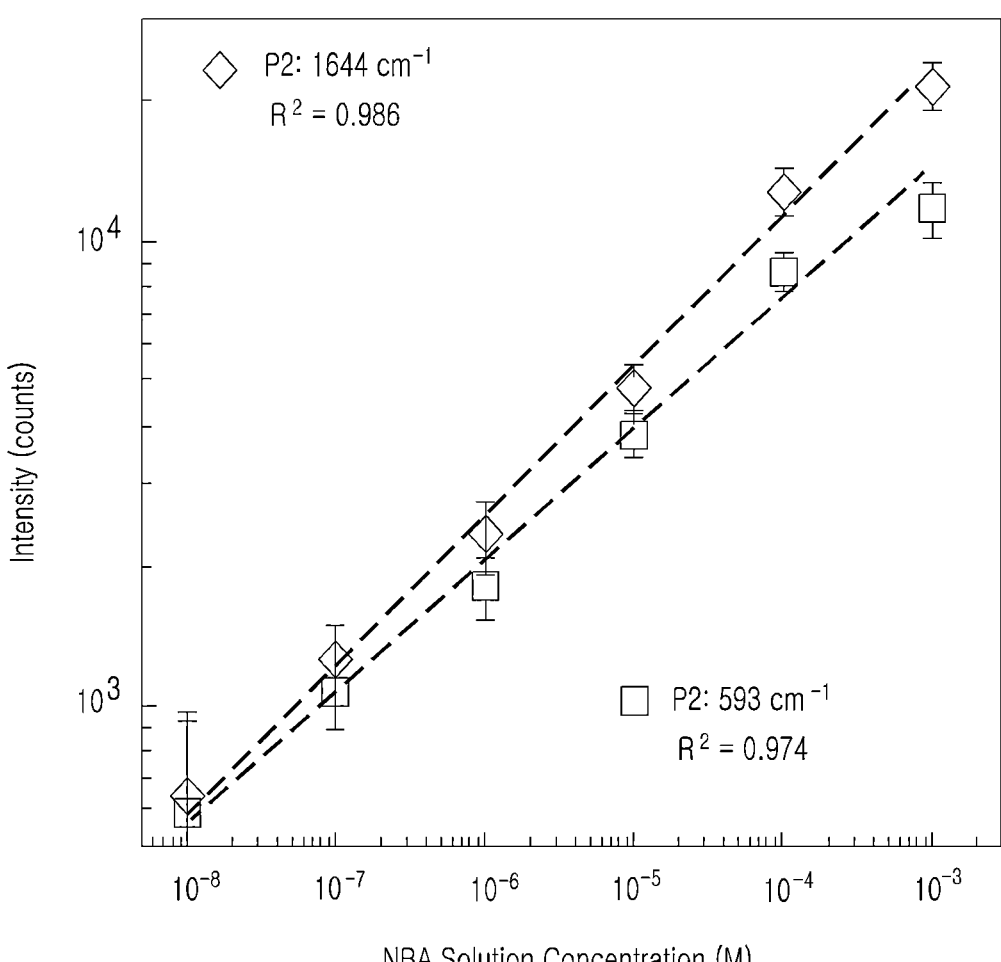
Figure 6A:
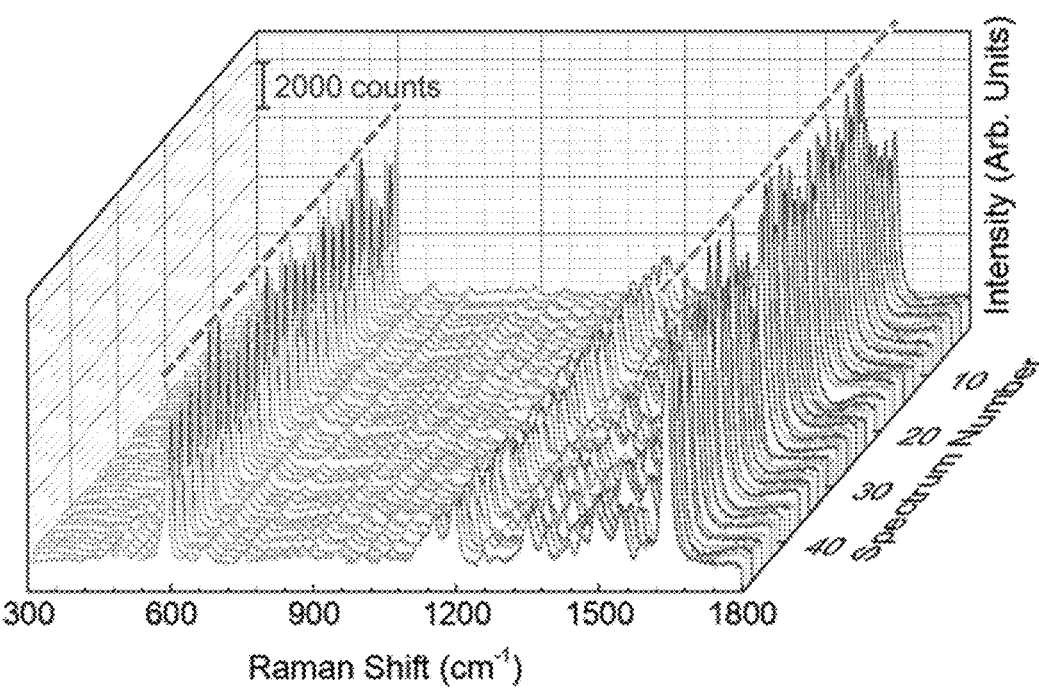
Figure 6B:
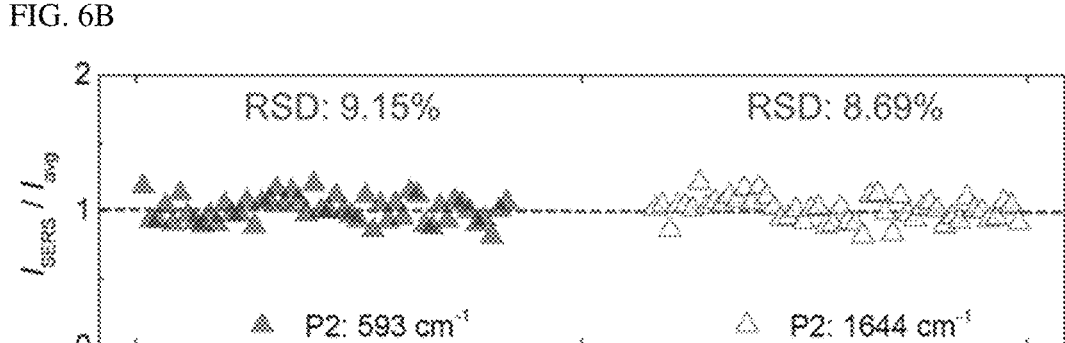
Figure 7:
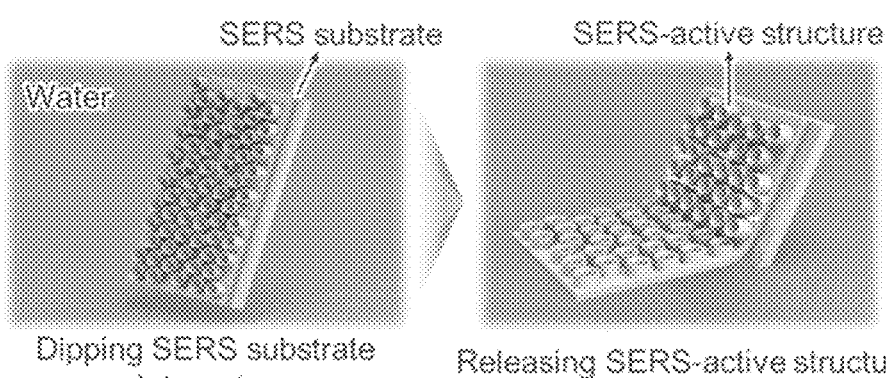
Figure 7:
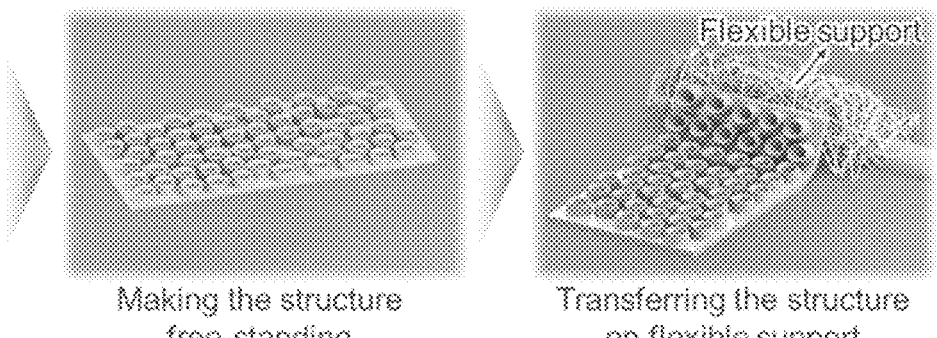
Figure 8A:
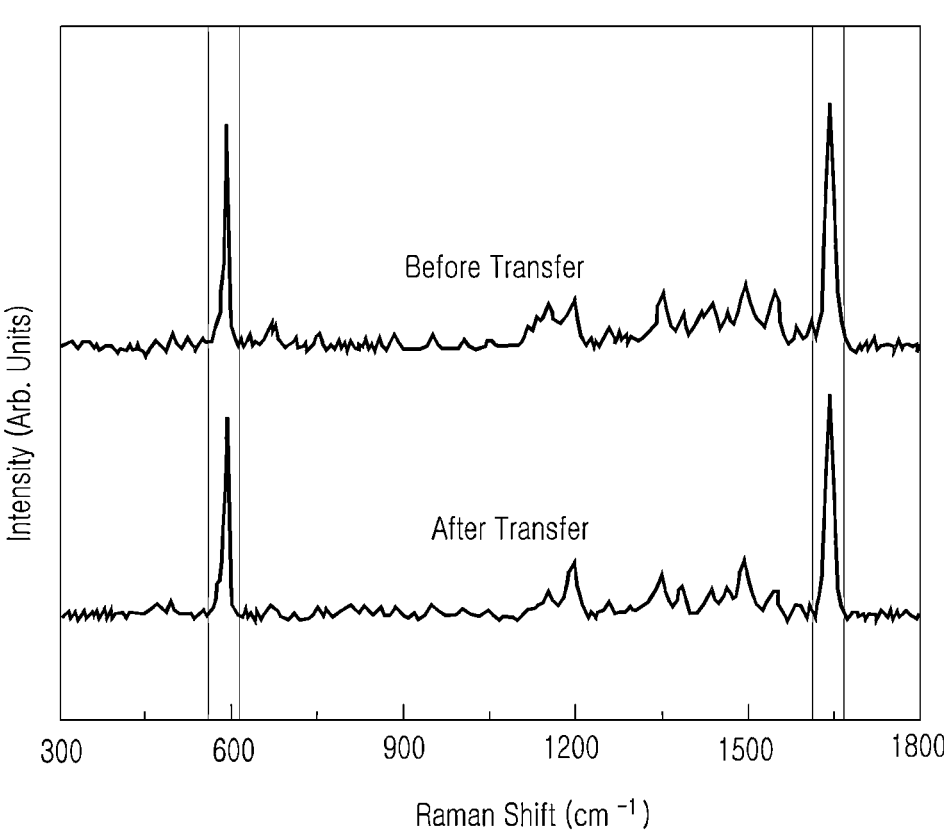
Figure 8B:
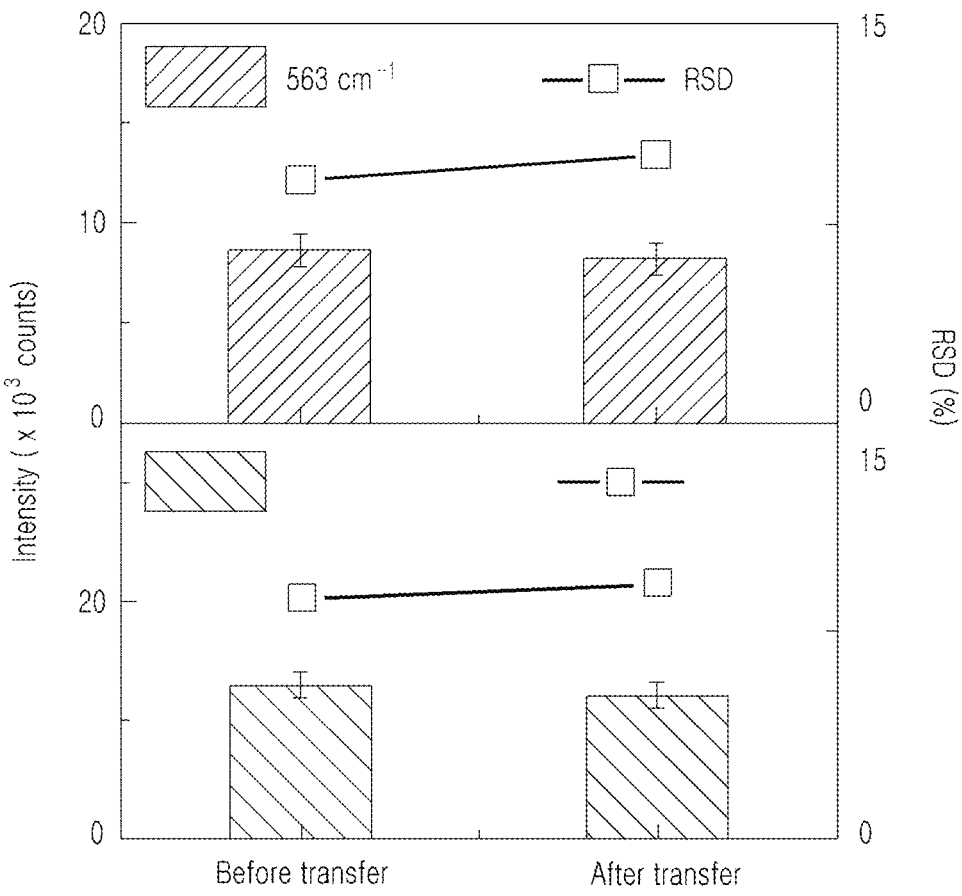
Figure 8C:
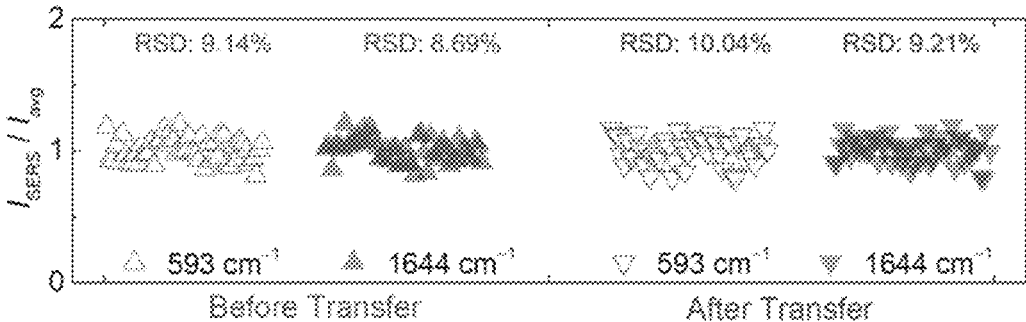
Figure 9A:
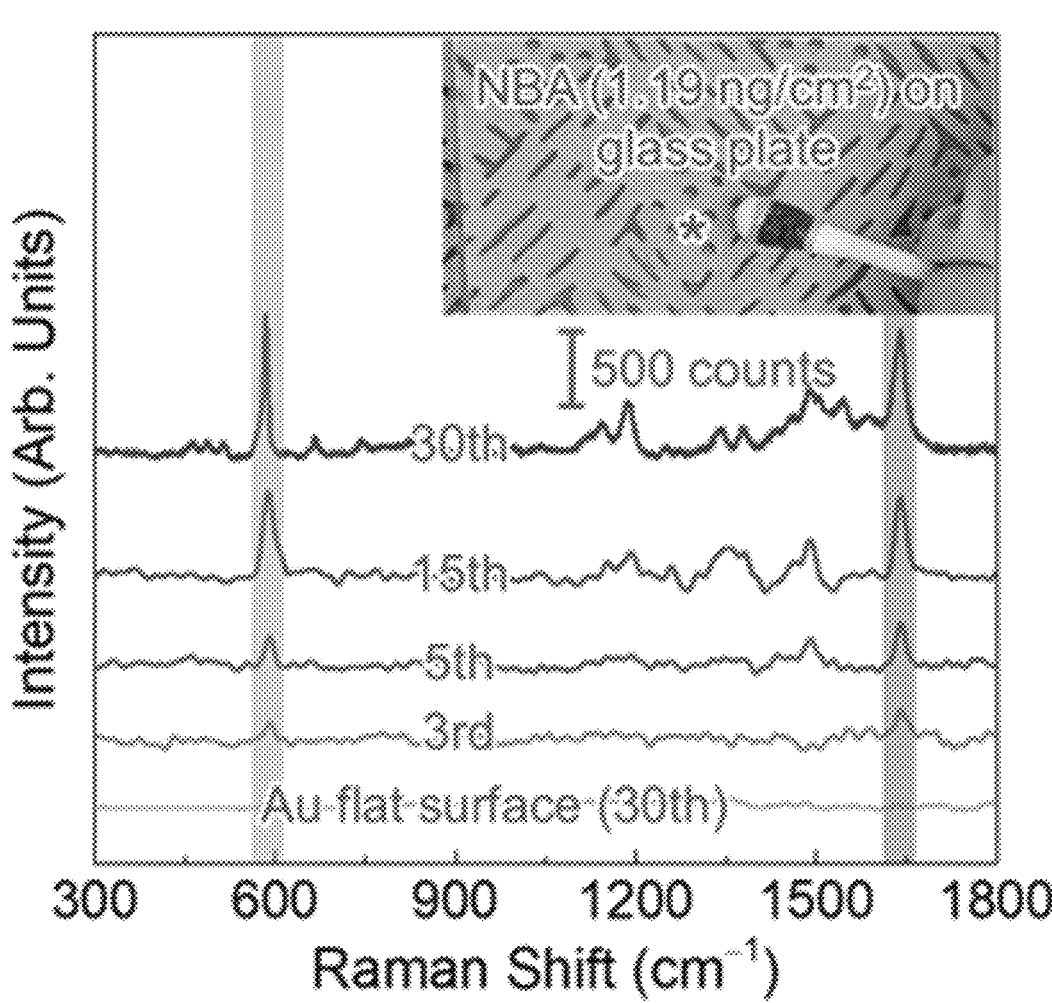
Figure 9B:
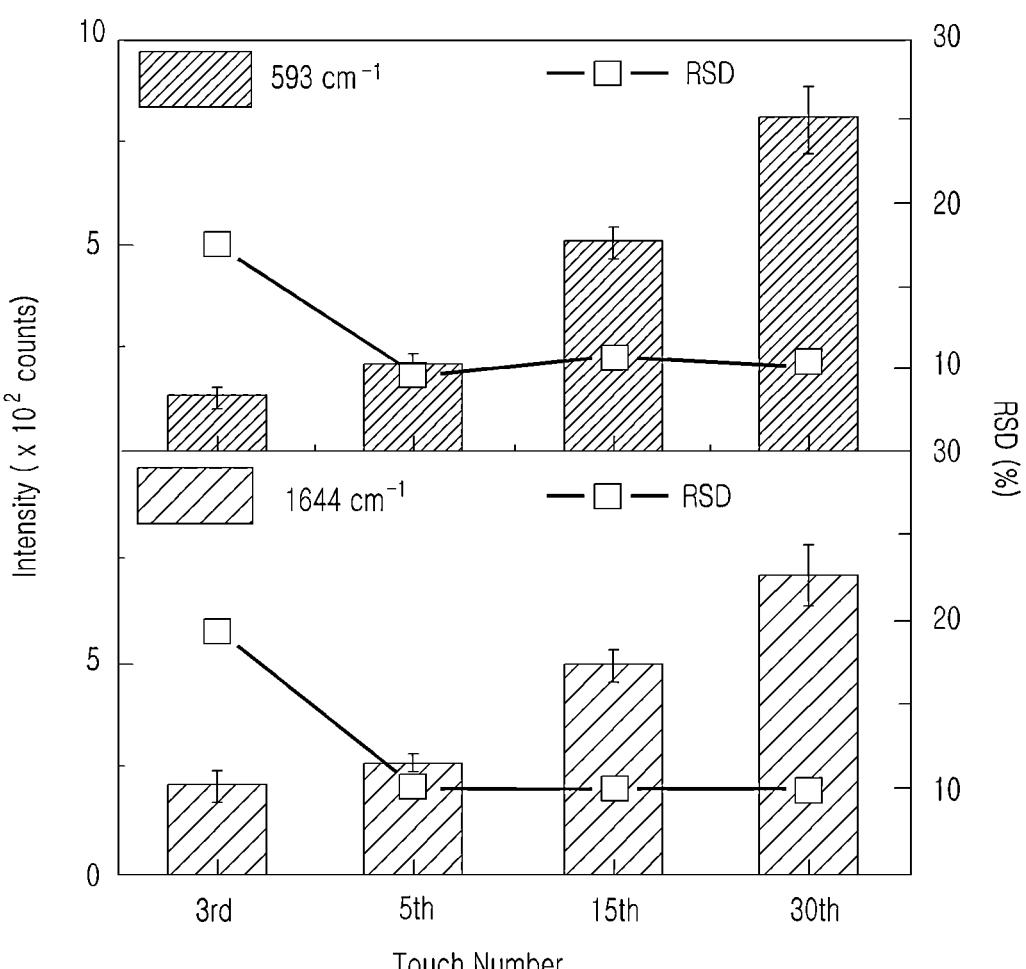
Figure 10A:
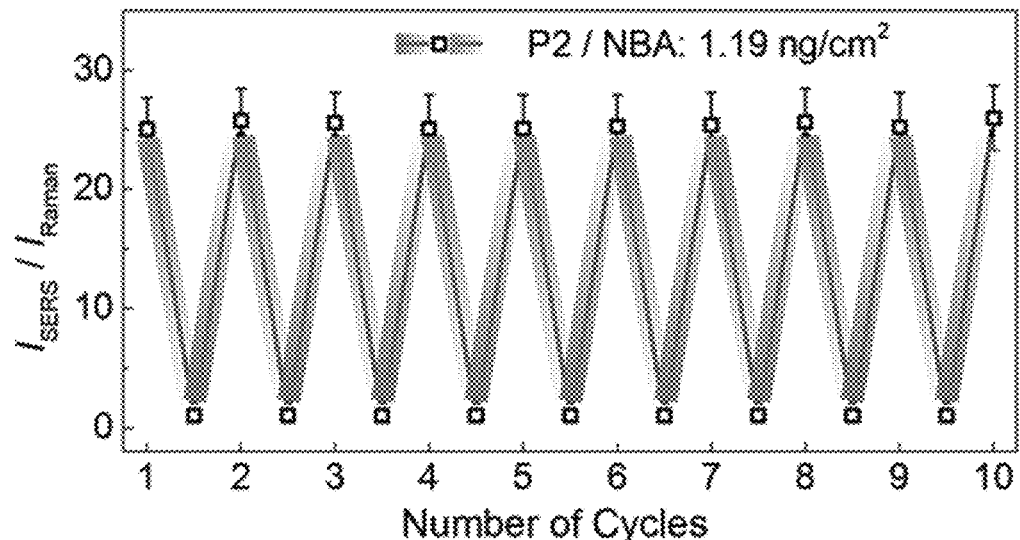
Figure 10B:
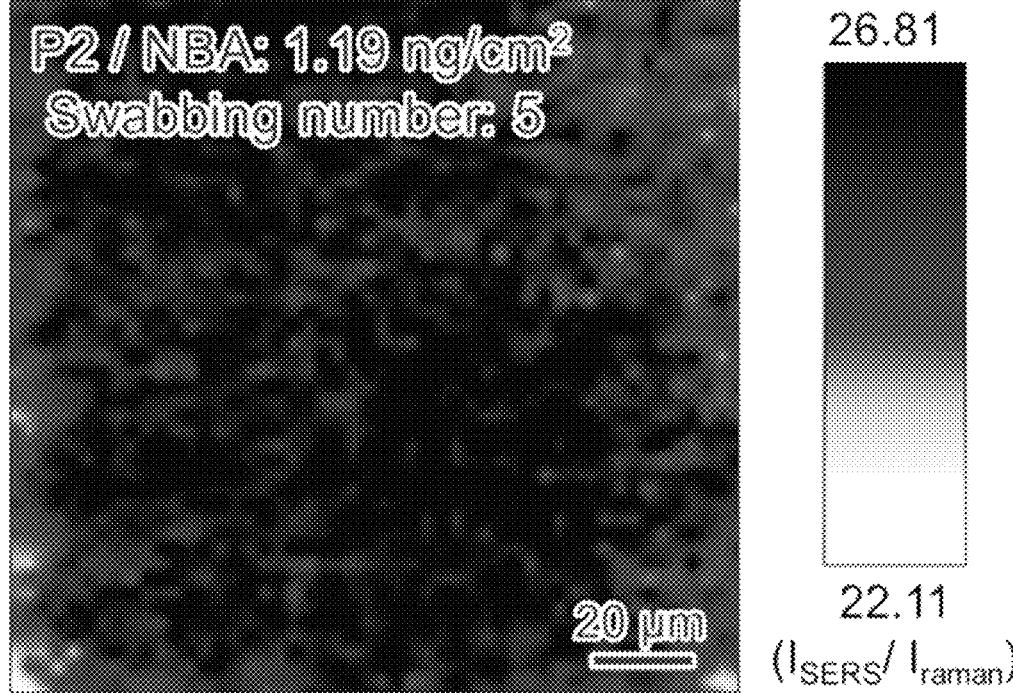
Figure 11A:
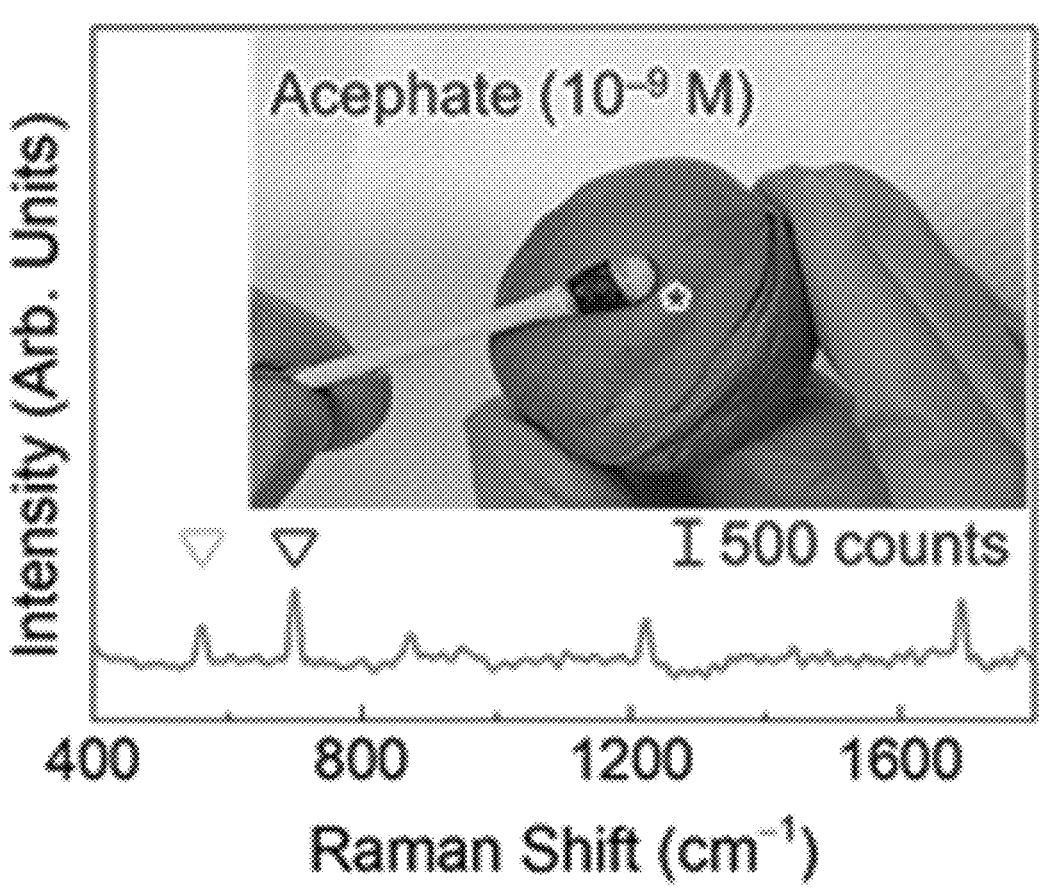
Figure 11B:
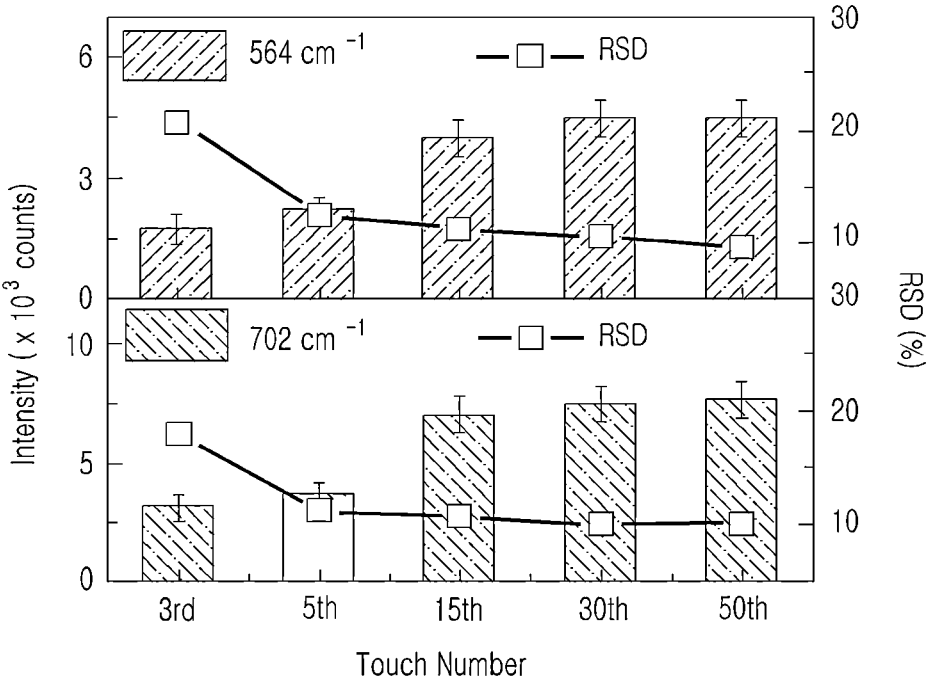
Figure 11C:
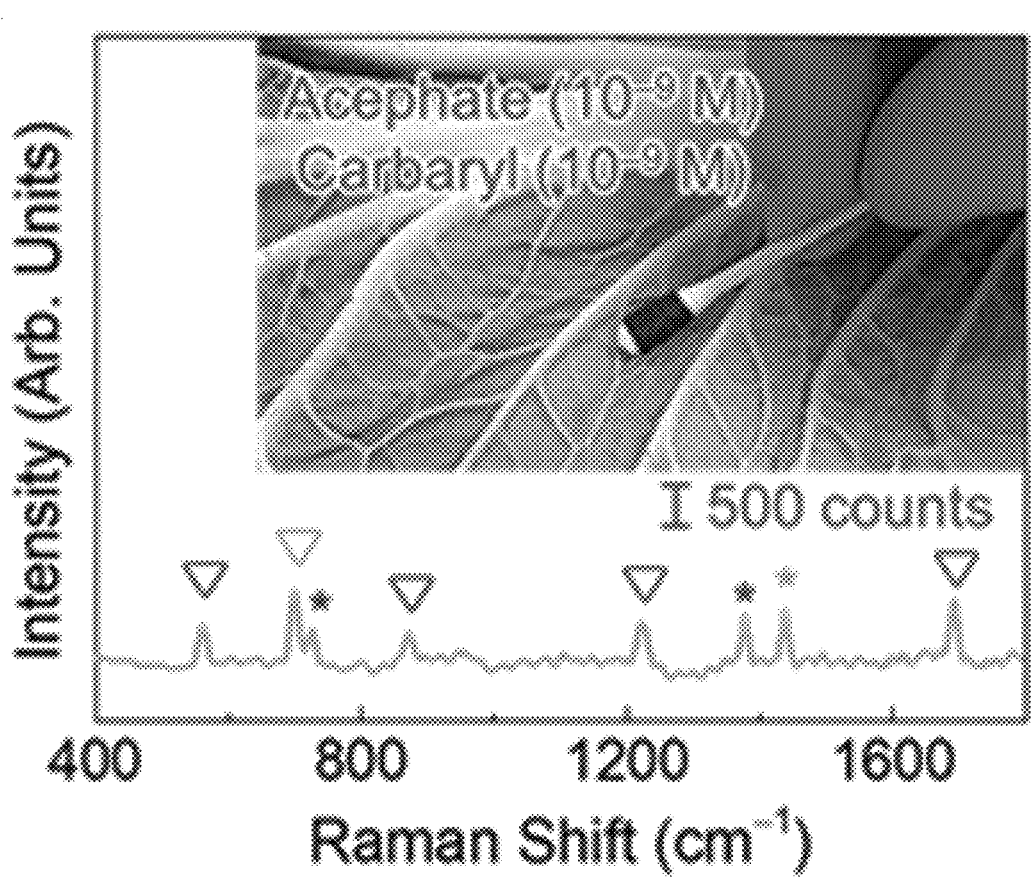
Figure 11D:
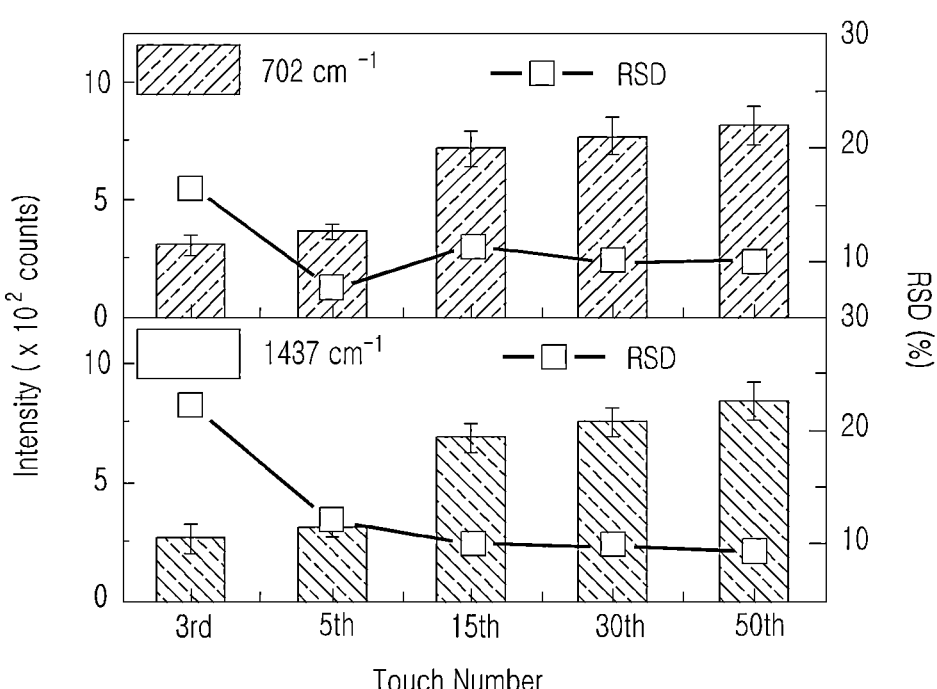
Figure 11E:
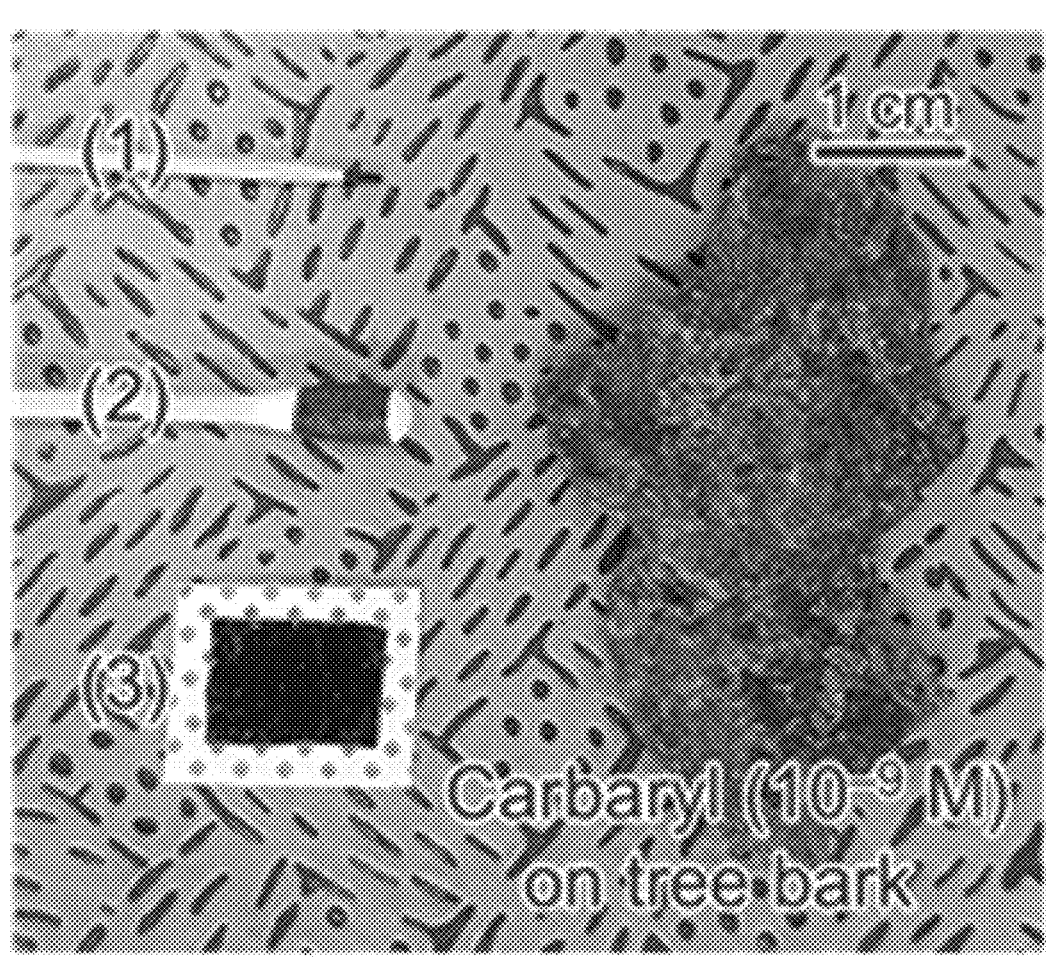
Figure 12:
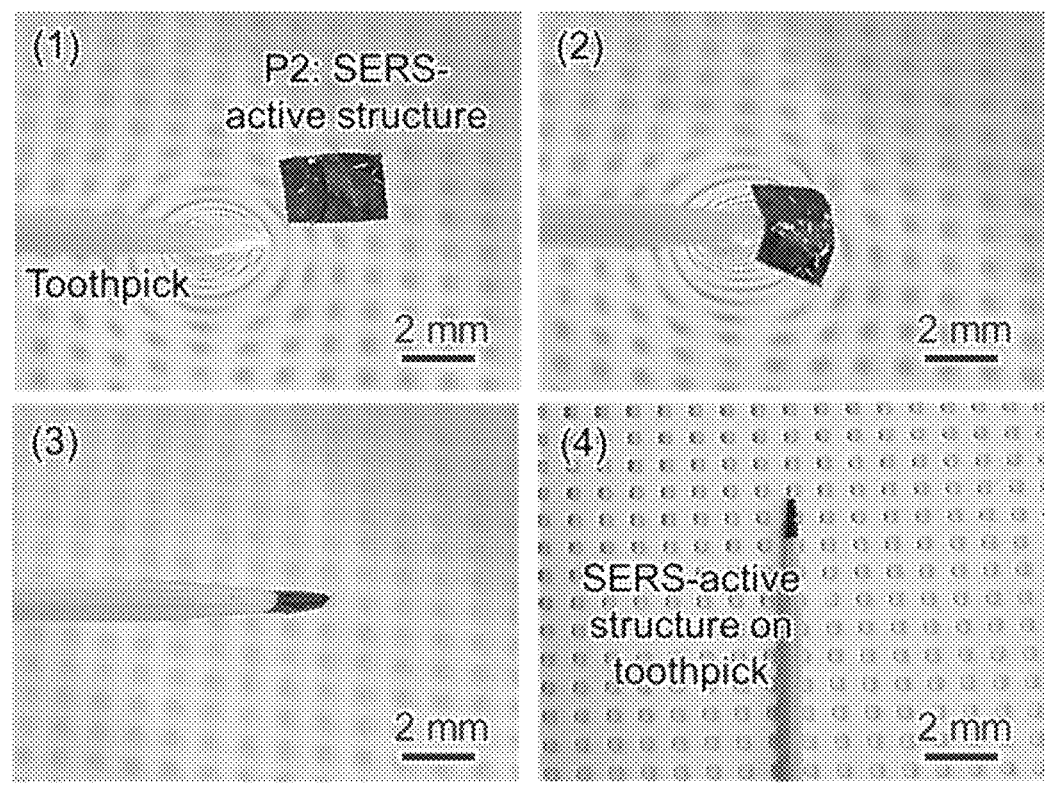
Figure 13A:
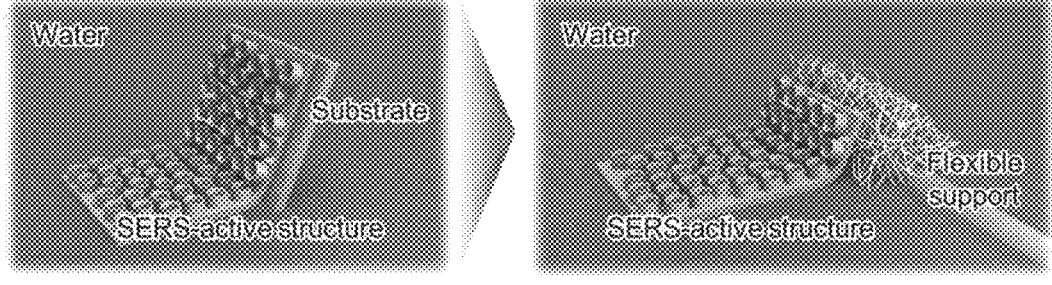
Figure 13B:
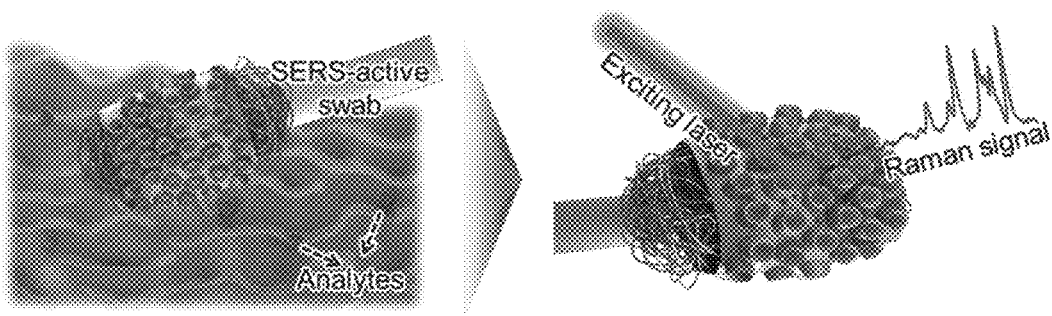

1D shows a process of producing the flexible SERS substrate by evaporating remaining moisture through heat treatment;

Figure 2B:
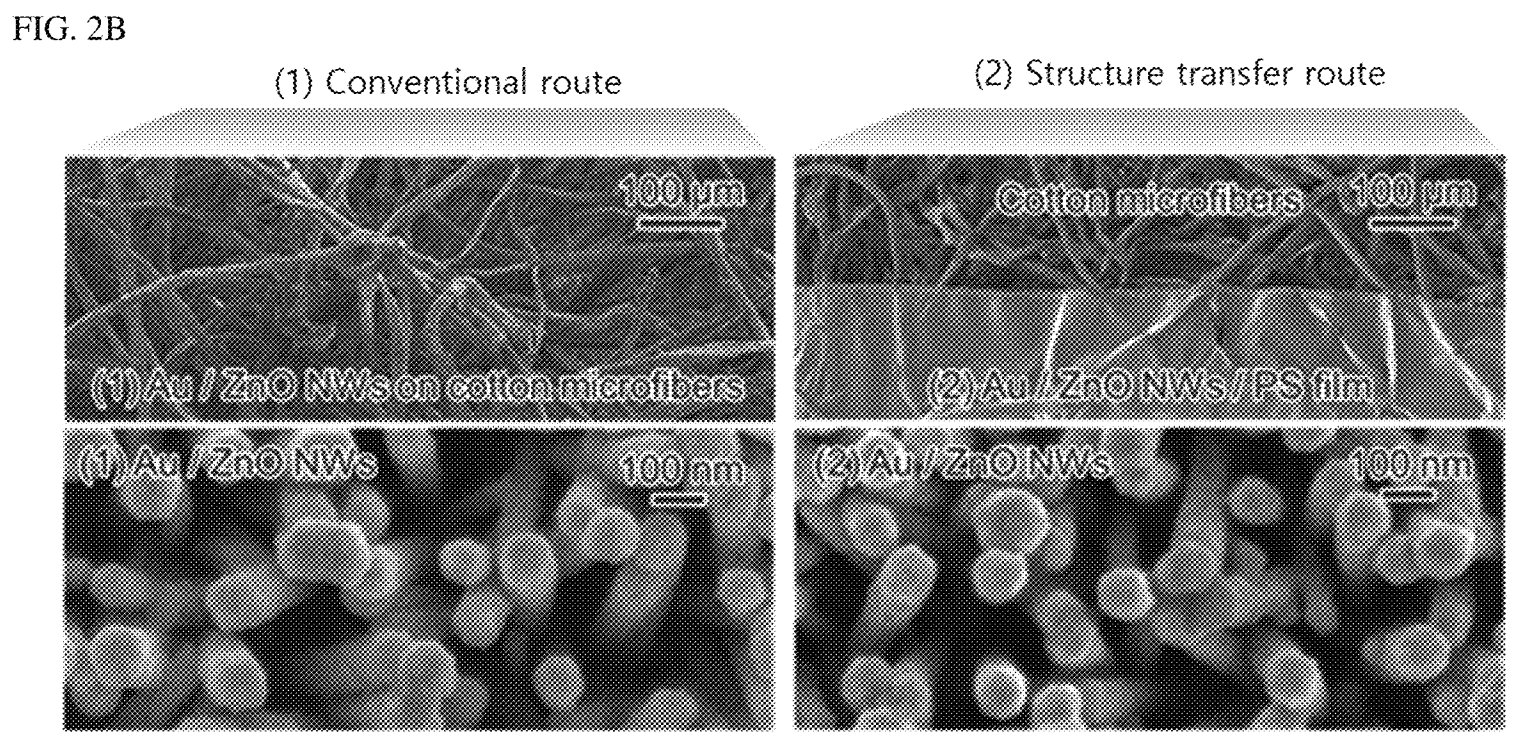

FIGS. 2A-2E are each a view comparing the Raman signal detection performance between a scheme of forming an SERS induced structure (gold-zinc oxide nanowire) on a cotton swab using an existing chemical synthesis method and a scheme of transferring the SERS induced structure onto a cotton swab using a structure transfer method; FIG. 2A shows SERS induced swabs synthesized in different ways; FIG. 2B shows gold-zinc oxide nanowires of the same size growing differently through a scanning electron microscope image; FIGS. 2C to 2E show contrasting sensing capabilities between the two ways;

FIGS. 3A-3C are each a view showing the difference in signal scattering degree between flexible SERS substrates according to an existing chemical method and a structure transfer method; FIG. 3A shows a comparison of the degree of signal scattering; FIG. 3B shows the degree of scattering of the incident laser; FIG. 3C shows the difference in laser focus and intensity observed in Raman measurement equipment;

FIGS. 4A-4C are each a view showing the formation of three different nanostructures produced through electrohydrodynamic instability using anodic aluminum oxide as an upper electrode. FIGS. 4A and 4B confirm the formation of different nanostructures when $\tau0/\tau m$, which represents the structure growth rate due to electrohydrodynamic instability, was controlled to 7.72, 18.14, and 37.62, respectively; in FIG. 4C, each is named P1, P2, and P3 for convenience, and an SERS induced structure was fabricated by depositing a gold thin film about 10 nm thick;

FIGS. 5A-5C are each a graph showing the result of Raman signal measurement and analysis of P1, P2, and P3; FIG. 5A shows that P2 shows the largest Raman signal peak among P1 to P3; FIG. 5B shows the signal intensity and RSD values compared when Raman signals were measured a total of 50 times at randomly selected points; FIG. 5C compares the Raman peak intensity and signal deviation at 593 cm$^{-1}$ for each concentration;

FIGS. 6A-6B are each a graph showing the signal reproducibility of P21;

FIG. 7 is a view showing a process of separating and transferring the SERS induced structure of P2 through capillary separation;

FIGS. 8A-8C are each a graph showing a result of Raman signal analysis before and after transfer of the SERS induced structure of P2; FIGS. 8A shows the Raman signal peaks of Nile Blue A before and after transfer; FIGS. 8B shows signal intensity before and after transfer; FIG. 8C shows the Raman signal deviation before and after transfer;

FIGS. 9A-9B are each a graph showing a result of detection of Nile Blue A at a concentration of 1.19 ng/cm$^2$ using a rubbing technique; FIG. 9A shows the Raman peak signal intensity as the number of times of rubbing increases; FIG. 9B shows the result of statistical analysis;

FIGS. 10A-10B are each a view showing a result of measuring (a) reusability and (b) signal uniformity of a flexible SERS substrate manufactured through a structure transfer method;

FIGS. 11A-11F are each a view showing a result of clinical sample measurement according to a rubbing technique using a flexible SERS substrate manufactured through the disclosure; FIG. 11A shows a result of measuring the Raman signal by rubbing the surface of a walnut on which pesticide residue (Acephate) was adsorbed; FIG. 11B is a graph confirming the signal amplification intensity as the number of rubbing increases; FIG. 11C shows the Raman peak and peak when two different pesticide residues, Acephate ($10^{-9}$M) and Carbaryl ($10^{-9}$M), were adsorbed at the same concentration on flexible and bumpy cabbage leaves; FIG. 11D is a graph of signal amplification and RSD value as the number of rubbing increases in this case; FIG. 11E is an 11F Raman peak result when Carbaryl ($10^{-9}$M) is adsorbed on tree bark, which shows considerable roughness;

FIG. 12 is a view showing transferring an SERS induced structure onto the surface of a regular toothpick; and FIGS. 13A-13B are each a view showing (a) a process of separating the SERS induced structure through capillary force and then transferring the same to a desired transfer target, and (b) a process of detecting minute clinical specimens with a flexible SERS substrate produced through the process described above.

DETAILED DESCRIPTION

Hereinafter, the disclosure will be described with reference to the accompanying drawings. However, the disclosure may be implemented in various different forms and, therefore, is not limited to the examples described herein. In order to clearly explain the disclosure in the drawings, portions unrelated to the description are omitted, and similar portions are given similar reference numerals throughout the specification.

Throughout the specification, when a portion is said to be "connected (linked, contacted, combined)" with another portion, this includes not only a case of being "directly connected" but also a case of being "indirectly connected" with another member in between. In addition, when a portion is said to "include" a certain component, this does not mean that other components are excluded, but that other components may be added, unless specifically stated to the contrary.

The terms used herein are merely used to describe specific embodiments and are not intended to limit the disclosure. Singular expressions include plural expressions unless the context clearly dictates otherwise. In this specification, it should be understood terms such as "include" or "have" are to designate the presence of features, numbers, steps, operations, components, parts, or combinations thereof described in the specification, but are not to exclude in advance the possibility of the presence or addition of one or more other features, numbers, steps, operations, components, parts, or combinations thereof.

Hereinafter, embodiments of the disclosure will be described in detail with reference to the accompanying drawings.

Terms used herein are defined as follows.

"P1, P2, P3" refers to the case where $\tau_0/\tau_m$, which represents the structure growth rate due to electrohydraulic instability, is controlled to 7.72, 18.14, and 37.62, respectively.

"Transfer target" refers to a target into which an SERS induced structure is transferred.

Figure 1A:
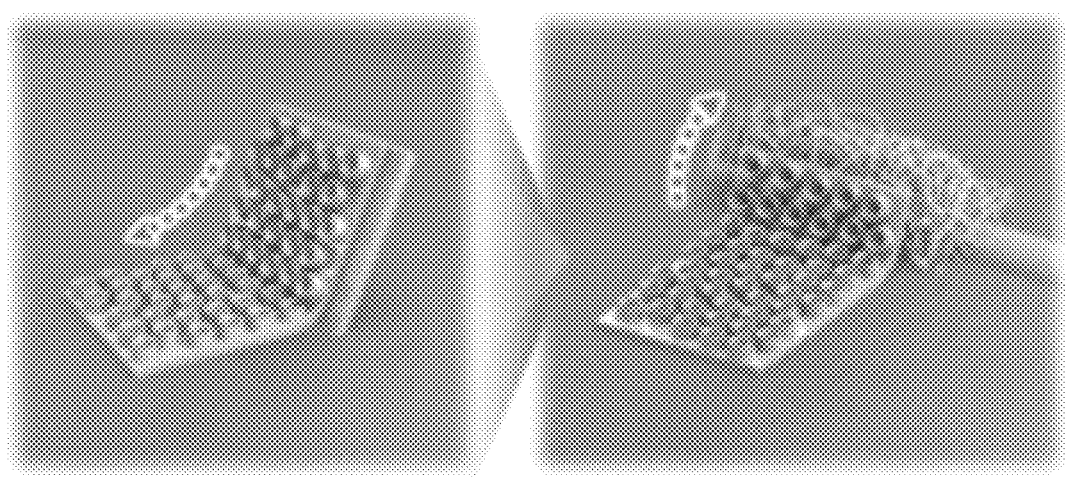
FIGS. 1A-1D are each a view showing a series of processes of capillary separation and subsequent transfer of a self-supporting SERS induced structure onto a non-plane.
Figure 1B:
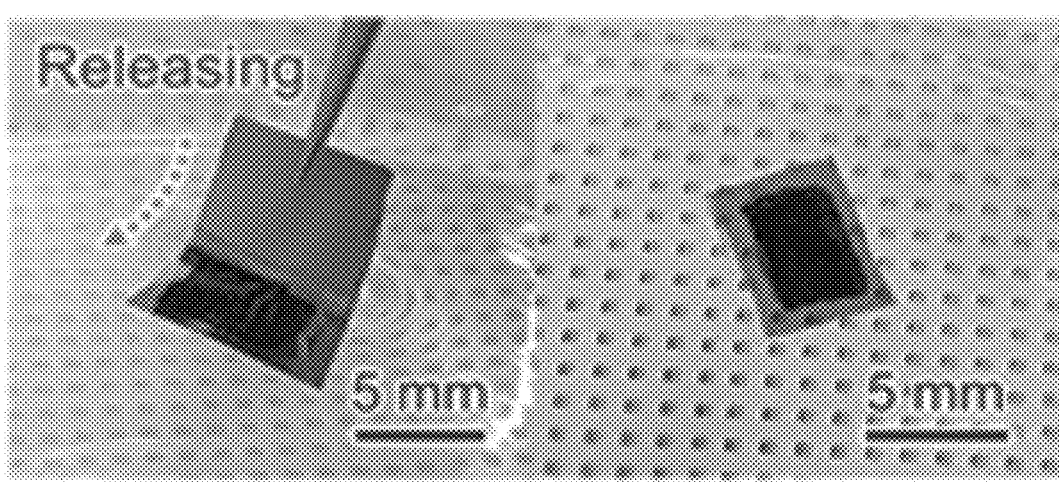
Figure 1C:
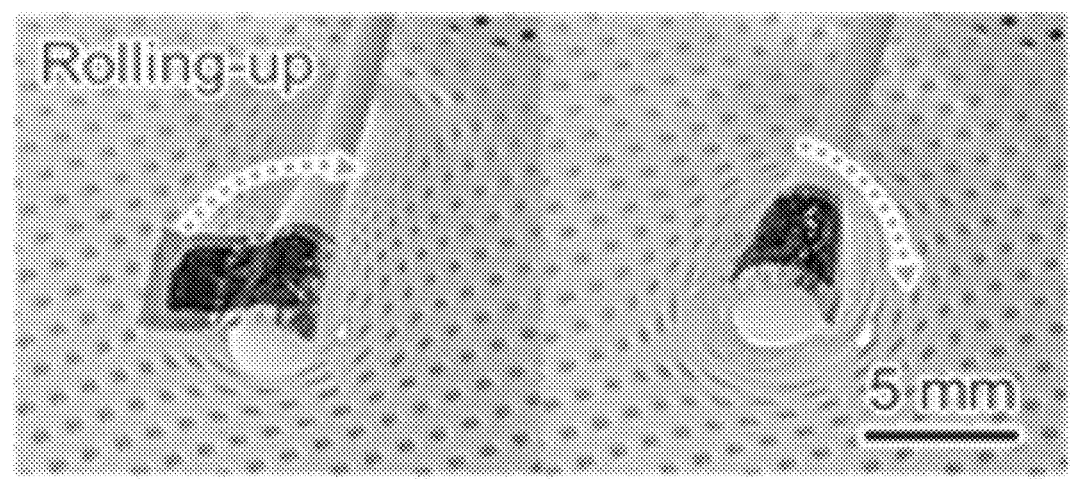
Figure 1D:
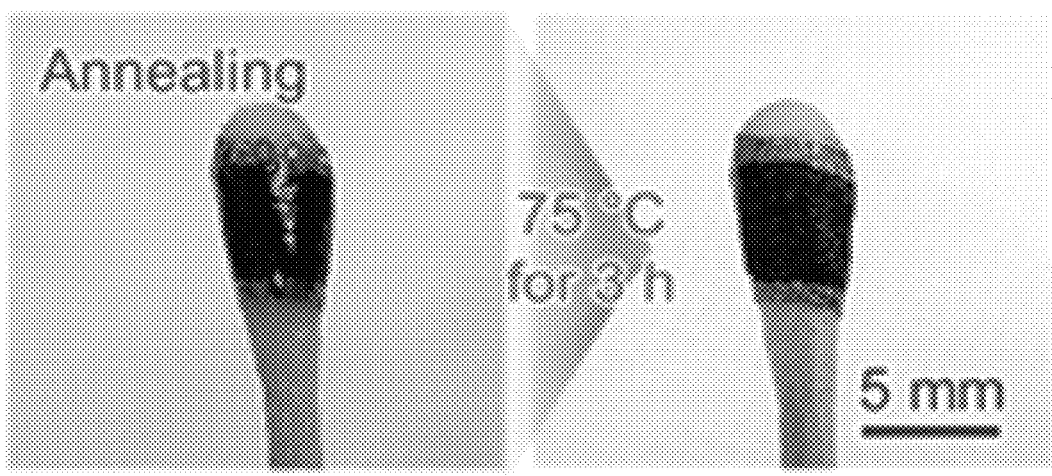

FIGS. 1A-1D are each a view showing a series of processes of capillary separation and subsequent transfer of a self-supporting SERS induced structure onto a non-plane;

FIG. 1A shows a process in which an SERS induced structure is separated from an existing substrate due to water penetration and transferred onto a flexible transfer target; FIG. 1B shows a process in which an actually manufactured SERS induced structure is separated upon contact with water and changes into a self-supporting form; FIG. 1C shows a process in which the self-supporting SERS induced structure is transferred onto a cotton swab through a slow rolling process after contacting the surface of the cotton swab; FIG. 1D shows a process of producing the flexible SERS substrate by evaporating remaining moisture through heat treatment;

Referring to FIG. 1, a method for transferring an SERS induced structure according to an embodiment of the disclosure will be described.

According to an embodiment of the disclosure, a method for transferring an SERS induced structure may include: forming a water-soluble thin film on a substrate; manufacturing an SERS induced structure on the water-soluble thin film; separating the SERS induced structure from the substrate through capillary separation; and transferring the separated SERS induced structure onto a flexible material.

The first step is forming a water-soluble thin film on a substrate.

The substrate is preferably a flat rigid substrate such as silicon, silicon oxide, glass, or alumina, but is not limited thereto. The available hydrophilic substrates do not require any special material type restrictions, but if the substrate is hydrophobic, hydrophilic treatment is required for uniform application of the water-soluble thin film and interfacial energy imbalance between the hydrophobic thin films. In order to treat the hydrophilicity of the substrate, including the embodiment, it is preferable to use oxygen plasma treatment or Piranha solution, but this is not necessarily limited thereto.

A water-soluble thin film is inserted between the substrate and the SERS induced structure to ensure reproducibility of the capillary separation phenomenon for structure separation.

Water-soluble substances do not require any special material restrictions other than being soluble in water, and types of materials that may be used include polymers containing water-soluble functional groups such as hydroxyl groups (—OH) or carboxyl groups (—COOH), ionic bonding material or polymeric material that forms ionic bonds with water molecules, water-soluble DNA materials with very long molecular chains, and the like.

More specifically, a water-soluble material forming the water-soluble thin film is selected from the group consisting of polyvinyl alcohol, polyethylene glycol, dextran, polyvinylpyrrolidone, carboxymethylcellulose, salmon DNA, sodium chloride, ammonium sulfate, or ammonium persulfate. However, this is not limited thereto.

The water-soluble thin film may have a thickness of 10 nm to 100 nm. However, this is not limited thereto.

The water-soluble thin film must be separated from the hydrophobic thin film in order to activate interfacial cracks due to dissolution, and accordingly, the two should not be mixed during an application procedure. Therefore, an application step is required to completely block the hydrophobic thin film and the substrate. For example, in the application step, the hydrophobic polymer solution must include the use of an organic solvent that does not dissolve the already applied water-soluble polymer. Accordingly, the use of polar organic solvents such as acetone, ethyl acetate, dimethylformamide, and dichloromethane is not permitted. The application procedure may include drop-casting, spray techniques, and spin coating.

The next is to manufacturing an SERS induced structure on the water-soluble thin film.

The manufacturing of the SERS induced structure may include manufacturing a metal nanostructure or manufacturing a polymer thin film-based structure.

More specifically, the manufacturing is to fabricate a microstructure on a water-soluble thin film through deposition or synthesis of a general metal material, or to fabricate an SERS induced structure by applying a polymer thin film and fabricating a polymer microstructure and then depositing a metal material again.

In the manufacturing of the metal nanostructure, it is possible to use vapor deposition of metal materials as long as the water-soluble thin film is not damaged due to high temperature use, and it is possible to use metal nano rods or metal nanoparticles.

In the manufacturing of the polymer thin film-based structure, as long as the inserted water-soluble thin film is not damaged, the upper polymer thin film can be fabricated using nanoimprinting, capillary force lithography, etching, hydrothermal synthesis, phase separation, and electrohydraulic patterning. At this time, a fine structure is formed on the surface of the polymer thin film applied on the water-soluble thin film, and then thin film deposition of metal materials (Au, Ag, Cu) for plasmon inducement may be allowed. In addition, the use of two-dimensional materials such as graphene, h-BN, and $MoS_2$ may also be allowed. In the case of metal material deposition, the thin film thickness does not limit the content of the disclosure, but is preferably at least 5 to 10 nm with reference to the embodiment.

In the disclosure, an "SERS induced structure" refers to a metal microstructure that generates a plasmon inducement effect, and this structure has an effect of significantly increasing the Raman signal of a detection material compared to a regular flat metal surface (signal intensity amplified by about 104 or more).

The next is separating the SERS induced structure from the substrate through capillary separation.

In the separating of the SERS induced structure, the SERS induced structure, water-soluble thin film, and substrate are simultaneously immersed in water and the substrate is placed into the water at a slower rate than the separation rate of the water-soluble thin film.

If the speed of immersing the substrate into water is faster than the speed at which the thin film is separated, complete separation of the thin film is likely to fail, and thus a step of immersing the substrate into water at a lower speed is included.

In the separating of the SERS induced structure, the moment the SERS induced structure, water-soluble thin film, and substrate touch water, the water-soluble thin film is dissolved rapidly and the SERS induced structure is separated from the substrate.

When the SERS induced structure, water-soluble thin film, and substrate come in contact with water, the water-soluble thin film dissolves and water penetration occurs due to interfacial energy imbalance. At this time, water rises between the structure and the substrate according to capillary force and simultaneously separates the structure through the surface tension of the water.

The separation process at this time may not allow any external contact with the upper surface of the thin film to be separated. Therefore, while the microstructure had surface properties such as superhydrophobicity or wavelength independence before separation, the surface properties can be fully achieve even after transfer because the structural properties are preserved during the transfer process.

The isolated SERS induced structure may be in a self-supporting form. Surface tension forces make the SERS induced structure a self-supporting form that floats on the water surface based on the surface energy of the water. Since the water penetration that causes separation occurs at the interface between the substrate and the structure, the SERS induced structure does not suffer structural damage during the separation process.

The next is transferring the separated SERS induced structure onto a flexible material.

A transfer target is an object onto which the SERS induced structure is transferred, and the use of various flexible materials such as cotton, non-woven fabric, paper, and cotton swabs may be allowed.

The transferring of the separated SERS induced structure may be transfer by the capillary force of water.

In detail, since a capillary separation phenomenon that occurs at the interface between an SERS induced structure substructure and a substrate is not directly related to the SERS induce structure superstructure, SERS induced structure separation and transfer processes are ensured through capillary separation.

The transfer process is a process of transferring a thin film structure onto a desired substrate using capillary force.

The capillary force-based transfer used in the disclosure may proceed in the following order: (1) slowly approaching a transfer target near a self-supporting SERS induced structure; (2) slowly taking the transfer target out of the water after the transfer target and the SERS induced structure come into contact; and (3) at this time, transferring the SERS induced structure from a water surface to the surface of the transfer target by the capillary force of water.

At this time, the speed at which the transfer target is slowly taken out of the water is suitably 0.1 to 0.3 mm/s in the vertical direction, but the disclosure is not limited thereto.

The transferring of the separated SERS induced structure may further include a heat treatment step after the transfer.

The heating may be performed at 50 to 90° C. to evaporate remaining moisture and simultaneously strengthen the adhesion between the SERS induced structure and the transfer target.

Hereinafter, a flexible SERS substrate according to another embodiment of the disclosure will be described.

According to an embodiment of the disclosure, a flexible SERS substrate may include a flexible SERS substrate manufactured by transferring and drying an SERS induced structure on a flexible material according to the method described above.

The flexible SERS substrate may be usable in a rubbing technique.

The rubbing technique allows direct collection of clinical specimens through contact between a flexible SERS substrate and the surface on which a clinical specimen is located. This collection of clinical specimens allows for immediate Raman signal measurement without any additional sample processing steps. In this technique, repetitive rubbing causes condensation of the collected clinical specimen, making Raman signal amplification possible through the "condensation effect".

The disclosure allows for technological compatibility with existing SERS substrate research because the use of flat rigid substrates for the fabrication of SERS induced structures is allowed.

In addition, because there are no restrictions on a transfer target, very small clinical samples are allowed, even if they are non-planar, showing extreme roughness and unevenness depending on the structural design and physical properties of the material.

The embodiment demonstrates, but is not limited to, detection of clinical samples from foodstuffs and everyday items such as walnut shells, cabbage leaves, tree bark, etc., through a flexible SERS substrate for the rubbing technique.

The transferred SERS induced structure may cover the surface of the flexible material. Since the transferred SERS induced structure covers the irregularly rough surface of the flexible transfer target, problems with Raman signal scattering and laser scattering are minimized.

Therefore, the disclosure includes a step of minimizing the surface roughness of the transfer target through a transfer process, thereby improving signal reproducibility.

The disclosure includes a step in which sensing strategy evaluation can be systematically performed with an increase in SERS detection performance through high signal reproducibility.

In an embodiment of the disclosure, signal reproducibility is quantified by an indicator called "relative standard deviation (RSD)", which is as follows.

$$RSD\,(\%) = \frac{\sqrt{\dfrac{\sum\limits_{i=1}^{n}(I_i - I_{avg})^2}{n-1}}}{I_{avg}}$$

At this time, n is the number of measured Raman spectra, $I_{avg}$ is the average intensity of a given Raman signal peak, and $I_i$ represents the same signal peak intensity in each Raman spectrum.

The disclosure includes a step of using a flexible SERS substrate manufactured through structure transfer using a rubbing technique. Rubbing on any surface where a detection target is located, that is, the act of repeatedly touching a specific location, results in a clinical sample being concentrated on one spot on the surface of an SERS induced structure. Again, this results in signal amplification depending on the number of rubbings in Raman signal detection.

The disclosure includes a step of allowing detection of Raman signals through rubbing over various non-planar surfaces, for example extremely non-uniform or rough surfaces.

In an embodiment of the disclosure, one rubbing is defined as moving the flexible SERS substrate 4 cm while in contact with the detection surface. According to this, n rubbings are the result of moving the flexible SERS substrate over the detection surface by 4·n cm.

The disclosure allows for reproducible signal detection with an RSD of approximately 10% even on fairly rough or extremely non-uniform surfaces.

Through embodiments, the disclosure discloses the detection of extremely small clinical samples on the surfaces of everyday items such as walnuts, cabbage leaves, and tree bark.

FIGS. 2A-2E are each a view comparing the Raman signal detection performance between a scheme of forming an SERS induced structure (gold-zinc oxide nanowire) on a cotton swab using an existing chemical synthesis method and a scheme of transferring the SERS induced structure onto a cotton swab using a structure transfer method;

FIG. 2A shows SERS induced swabs synthesized in different ways; FIG. 2B shows gold-zinc oxide nanowires of the same size growing differently through a scanning electron microscope image, wherein it can be seen that in the case of the drawing on the left, with the existing technology, the surface roughness is reflected as it is by growing directly on the surface of the cotton swab, and in the case of the drawing on the right, the polystyrene thin film transferred by the structure transfer method completely covers the roughness of the cotton swab. FIGS. 2C to 2E show contrasting sensing capabilities between the two ways. In the case of the existing method, the Raman signal intensity is relatively weak and shows large deviations because the surface roughness is reflected as is. On the other hand, in the case of a structure transfer method, signal scattering due to minimal surface roughness is minimized, resulting in relatively greater signal intensity as well as excellent signal reproducibility. As for a detection target, Raman signal measurement was performed by depositing and drying rhodamine 6G at a concentration of $10^{-5}$M on two detection cotton swabs. Unlike the flat gold surface, the Raman signal of rhodamine 6G was detected in both cases. Raman signals measured at 611, 1186, and 1649 cm$^{-1}$, respectively, evidence the presence of rhodamine 6G. A comparison of Raman signal intensity measured at 1649 cm$^{-1}$ is shown in FIG. 2D. According to this, high signal intensity and low signal deviation can be confirmed in the structure transfer method. FIG. 2E shows the ratio of each measured signal intensity (ISERS) divided by the average signal intensity (Iavg), quantifying the signal deviation. In the case of the existing method, RSD was measured as 41.27, 52.16, and 53.39% at 611, 1186, and 1649 cm$^{-1}$, respectively. It can be seen that in the case of the structure transfer method disclosed in the disclosure, the RSD was recorded as a significantly low value of 10.21, 9.14, and 9.18%, respectively.

The above results can be understood as the result of Raman signal and laser signal scattering due to the rough surface.

FIGS. 3A-3C are each a view showing the difference in signal scattering degree between flexible SERS substrates according to an existing chemical method and a structure transfer method.

FIG. 3A shows a comparison of the degree of signal scattering; FIG. 3B shows the degree of scattering of the incident laser; and FIG. 3C shows the difference in laser focus and intensity observed in Raman measurement equipment.

Referring to FIG. 3, it can be confirmed that in the case of the existing chemical method, the rough surface is reflected as is so that not only the excitation laser is scattered but also the Raman signal to be captured is scattered, but in the case of structure transfer, the problem of signal scattering is minimized because the rough surface is covered by structure transfer.

FIGS. 4A-4C are each a view showing the formation of three different nanostructures produced through electrohydrodynamic instability using anodic aluminum oxide as an upper electrode. The formation of a structure upon application of voltage was confirmed with anodic aluminum oxide (AAO) having a diameter of approximately 400 nm used as the upper electrode.

FIGS. 4A and 4B confirm the formation of different nanostructures when τ0/τm, which represents the structure growth rate due to electrohydrodynamic instability, was controlled to 7.72, 18.14, and 37.62, respectively; in FIG. 4C, each is named P1, P2, and P3 for convenience, and an SERS induced structure was fabricated by depositing a gold thin film about 10 nm thick;

FIGS. 5A-5C are each a graph showing the result of Raman signal measurement and analysis of P1, P2, and P3.

The detection target was Nile Blue A at a concentration of $10^{-4}$ M, and in all three cases, Raman peaks indicating Nile Blue A were observed at 593 cm$^{-1}$ and 1644 cm$^{-1}$, respectively.

FIG. 5A shows that P2 shows the largest Raman signal peak among P1 to P3. FIG. 5B shows the signal intensity and RSD values compared when Raman signals were measured a total of 50 times at randomly selected points. In particular, P2 had the best signal reproducibility, with RSD values of 9.15% at 593 cm$^{-1}$ and 8.69% at 1644 cm$^{-1}$, respectively. FIG. 5C compares the Raman peak intensity and signal deviation at 593 cm$^{-1}$ for each concentration. A linear increase can be seen on a log-log scale, and the results confirm that quantitative analysis through Raman signal analysis is possible in the case of P2.

FIGS. 6A-6B are each a graph showing the signal reproducibility of P21.

It can be confirmed that the signal is almost uniform even after 50 repeated measurements.

FIG. 7 is a view showing a process of separating and transferring the SERS induced structure of P2 through capillary separation;

P2, which had proven to have the best SERS capability, was transferred to a flexible transfer target according to the structure transfer method.

FIGS. 8A-8C are each a graph showing a result of Raman signal analysis before and after transfer of the SERS induced structure of P2; The sensing ability of the SERS induced structure of P2 was verified before and after structure transfer, and the same detection material, Nile Blue A, was used.

Referring to FIG. 8A, the same Raman signal peak representing Nile Blue A was observed even after transfer. Referring to FIG. 8B, the signal intensity decreased by about 5.61% and 6.71% at 593 cm$^{-1}$ and 1644 cm$^{-1}$ even after transfer, from which it can be seen that almost all is preserved. In addition, it can be seen that even after transfer, the RSD values are 10.04% and 9.21%, respectively, which are almost identical to those before transfer (9.14% and 8.69%, respectively). FIG. 8C shows the Raman signal deviation before and after transfer, and it can be seen that similar signal deviation is shown both before and after transfer.

FIGS. 9A-9B are each a graph showing a result of detection of Nile Blue A at a concentration of 1.19 ng/cm$^2$ using a rubbing technique. A flexible SERS substrate was fabricated through structure transfer based on P2.

Referring to FIG. 9A, an increase in Raman peak signal intensity was observed at 593 cm$^{-1}$ and 1644 cm$^{-1}$ as the number of rubbing increases. Referring to FIG. 9B, it can be seen from the statistical analysis that the RSD maintains 10% when the number of rubbing times is 5 or more, and the Raman peak intensity increases up to 30 times.

FIGS. 10A-10B are each a view showing a result of measuring (a) reusability and (b) signal uniformity of a flexible SERS substrate manufactured through a structure transfer method.

Nile Blue A with a density of 1.19 ng/cm$^2$ was rubbed five times for adsorption, and the Raman signal located at 593 cm$^{-1}$ were measured. Afterwards, the flexible SERS substrate was soaked in ethanol for 5 hours to remove the adsorbed Nile Blue A, and it was confirmed that the Raman signal of the material was not observed. The above procedure was performed repeatedly.

Referring to FIG. 10A, I$_{SERS}$/I$_{Raman}$, which indicates the degree of signal amplification, was confirmed to be maintained at about 25 even after 10 repetitive cycles, and the same degree of signal amplification was confirmed. FIG. 10B shows the signal intensity of the Raman peak (593 cm$^{-1}$) of Nile Blue A in an area of 150×150 μm$^2$ as a result of Raman mapping. As a result of five rubbings, the pointby-point Raman mapping showed a uniform signal, and the specified Raman signal amplification ratio I$_{SERS}$/I$_{Raman}$ was confirmed to be uniform from 22.11 to 26.81.

FIGS. 11A-11F are each a view showing a result of clinical sample measurement according to a rubbing technique using a flexible SERS substrate manufactured through the disclosure; An SERS flexible substrate was used to detect clinical specimens on three different non-flat surfaces for field detection testing.

FIG. 12 is a view showing transferring an SERS induced structure onto the surface of a regular toothpick.

Acephate (10$^{-9}$M) and Carbaryl (10$^{-9}$M), known pesticide substances, were used as clinical samples.

Referring to FIGS. 11A and 11B, as a result of measuring the Raman signal by first rubbing the surface of the walnut on which the pesticide residue (Acephate) was adsorbed, the corresponding Raman peak was confirmed, and it has been confirmed that as the number of rubbing increases up to 50, the signal amplification intensity increased, and an RSD value of 10% was confirmed.

Referring to FIGS. 11C and 11D, two different pesticide residues, Acephate (10$^{-9}$M) and Carbaryl (10$^{-9}$M), at the same concentration were adsorbed on flexible and bumpy cabbage leaves. At this time, Raman peaks that were differentiated from each other were confirmed through rubbing, and similarly, signal amplification and an RSD value in the 10% range were confirmed as the number of rubbing increases.

Figure 11F:
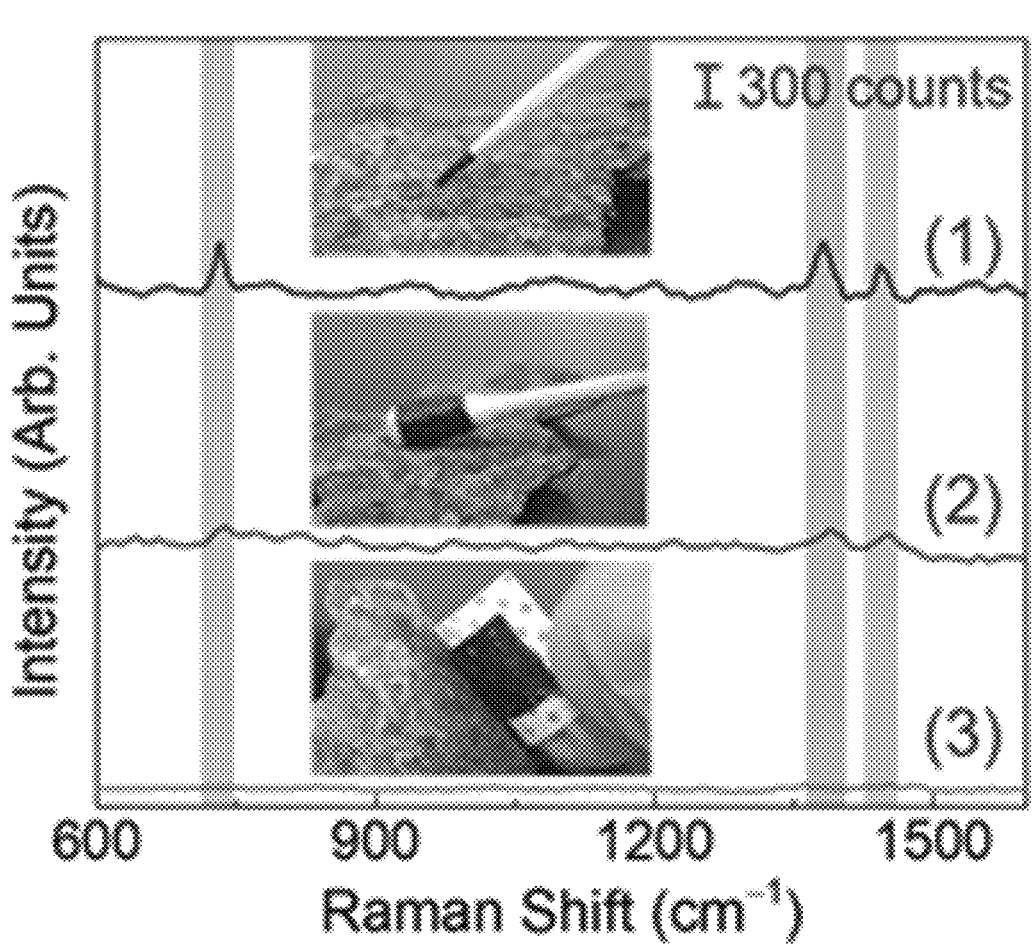

Referring to FIGS. 11E and 11F, Carbaryl (10$^{-9}$M) was adsorbed onto the bark of a tree showing significant roughness. In particular, three types of transfer targets corresponding to toothpicks, cotton swabs, and wipers were used for detection on fairly rough tree bark. As shown in FIG. 12, as a result of detection through rubbing, a clear Raman peak was confirmed in the case of a toothpick that is easily in contact with an irregularly rough surface, and this indicates the possibility of producing a customized flexible SERS substrate according to the design of the transfer target.

FIGS. 13A-13B are each a view showing (a) a process of separating the SERS induced structure through capillary force and then transferring the same to a desired transfer target, and (b) a process of detecting minute clinical specimens with a flexible SERS substrate produced through the process described above.

Through this, the SERS induced structure can be transferred onto the desired transfer target, and through this, a flexible SERS substrate can be manufactured, wherein these flexible SERS substrates can be used to collect and detect clinical samples by rubbing them on various non-flat surfaces. The Raman signal measured at this time can allow various SERS performance measurements with high reproducibility, and can be used on various detection surfaces depending on the transfer process and type of transfer structure.

An SERS induced structure produced through the microstructure transfer strategy disclosed in the disclosure is transferred onto a non-uniform and rough surface, and at this time, since the transfer structure covers the surface, Raman signals and laser scattering are minimized, thereby increasing signal reproducibility.

The structure transfer method disclosed in the disclosure is based on the capillary separation effect based on the capillary phenomenon of water, and does not depend on a specific substrate or structure, and thus is compatible with various microstructure manufacturing technologies.

As described above, the disclosure discloses the separation of the produced SERS induced structure, the transplantation thereof into a transfer target, and detection on various surfaces using the same, and in particular, the disclosure is significant in initiating systematic research on sensing performance based on improved signal reproducibility.

The description of the disclosure described above is for illustrative purposes, and those skilled in the art will understand that the disclosure is easily modifiable into other specific forms without changing the technical idea or essential features of the disclosure. Therefore, the examples described above should be understood in all respects as illustrative and not restrictive. For example, each component described as single may be implemented in a distributed manner, and similarly, components described as distributed may also be implemented in a combined form.

The scope of the disclosure is indicated by the claims described below, and all changes or modified forms derived from the meaning and scope of the claims and their equivalent concepts should be construed as being included in the scope of the disclosure.

What is claimed is:

1. A method for transferring an SERS induced structure, the method comprising:

forming a water-soluble thin film on a substrate;

manufacturing a surface-enhanced Raman scattering (SERS) induced structure on the water-soluble thin film;

separating the SERS induced structure from the substrate through capillary separation, wherein the capillary separation comprises dissolving the water-soluble thin film upon contact with water to release the SERS induced structure from the substrate; and transferring the separated SERS induced structure onto a flexible material through the capillary force of water.

2. The method of claim 1, wherein a water-soluble material forming the water-soluble thin film is selected from the group consisting of polyvinyl alcohol, polyethylene glycol, dextran, polyvinylpyrrolidone, carboxymethylcellulose, salmon DNA, sodium chloride, ammonium sulfate, or ammonium persulfate.

3. The method of claim 1, wherein the thickness of the water-soluble thin film is 10 nm to 100 nm.

4. The method of claim 1, wherein the manufacturing of the SERS induced structure comprises manufacturing a metal nanostructure or manufacturing a polymer thin film-based structure.

5. The method of claim 1, wherein in the separating of the SERS induced structure, the SERS induced structure, water-soluble thin film, and substrate are simultaneously immersed in water and the substrate is placed into the water at a slower rate than the separation rate of the water-soluble thin film.

6. The method of claim 1, wherein in the separating of the SERS induced structure, the moment the SERS induced structure, water-soluble thin film, and substrate touch water, the water-soluble thin film is dissolved and the SERS induced structure is separated from the substrate.

7. The method of claim 1, wherein the separated SERS induced structure is a self-supporting structure that floats on a water surface based on the surface energy of water.

8. The method of claim 1, wherein the transferring of the separated SERS induced structure further comprises post-transfer heating.

9. The method of claim 8, wherein the heating is performed at 50 to 90° C.

10. A flexible SERS substrate manufactured by transferring and drying an SERS induced structure on a flexible material according to claim 1.

11. The flexible SERS substrate of claim 10, wherein the SERS substrate is prepared using a rubbing technique.

12. The flexible SERS substrate of claim 11, wherein the transferred SERS induced structure covers the surface of the flexible material.

* * * * *